(12) United States Patent
Wang

(10) Patent No.: US 8,629,926 B2
(45) Date of Patent: Jan. 14, 2014

(54) IMAGING APPARATUS COMPRISING IMAGE SENSOR ARRAY HAVING SHARED GLOBAL SHUTTER CIRCUITRY

(75) Inventor: Ynjiun Paul Wang, Cupertino, CA (US)

(73) Assignee: Honeywell International, Inc., Fort Mill, SC (US)

( * ) Notice: Subject to any disclaimer, the term of this patent is extended or adjusted under 35 U.S.C. 154(b) by 215 days.

(21) Appl. No.: 13/289,795

(22) Filed: Nov. 4, 2011

(65) Prior Publication Data

US 2013/0112753 A1 May 9, 2013

(51) Int. Cl.
*H04N 5/335* (2011.01)

(52) U.S. Cl.
USPC .......................... 348/296; 348/297; 235/472.1

(58) Field of Classification Search
USPC .................. 348/296, 297, 298, 362, 363, 364; 235/462.01, 472.01
See application file for complete search history.

(56) References Cited

U.S. PATENT DOCUMENTS

| | | |
|---|---|---|
| 3,684,868 A | 8/1972 | Christie et al. |
| 3,716,699 A | 2/1973 | Eckert et al. |
| 4,253,447 A | 3/1981 | Moore et al. |
| 4,261,344 A | 4/1981 | Moore et al. |
| 4,350,418 A | 9/1982 | Taguchi et al. |
| RE31,289 E | 6/1983 | Moore et al. |
| RE31,290 E | 6/1983 | Moore et al. |
| 4,491,865 A | 1/1985 | Danna et al. |
| 4,516,017 A | 5/1985 | Hara et al. |
| 4,523,224 A | 6/1985 | Longacre, Jr. |
| 4,546,379 A | 10/1985 | Sarofeen et al. |
| 4,793,689 A | 12/1988 | Aoyagi et al. |
| 4,806,776 A | 2/1989 | Kley |
| 4,853,774 A | 8/1989 | Danna et al. |
| 4,854,302 A | 8/1989 | Allred, III |
| 4,862,253 A | 8/1989 | English et al. |
| 4,877,949 A | 10/1989 | Danielson et al. |
| 4,941,456 A | 7/1990 | Wood et al. |
| 4,957,346 A | 9/1990 | Wood et al. |
| 4,963,756 A | 10/1990 | Quan et al. |
| 5,019,699 A | 5/1991 | Koenck |
| 5,059,146 A | 10/1991 | Thomas et al. |
| 5,144,190 A | 9/1992 | Thomas et al. |
| 5,222,477 A | 6/1993 | Lia |

(Continued)

OTHER PUBLICATIONS

Theuwissen, Albert J.P., Science Direct "Solid-State Electronics" www.elsevier.com/locate/sse, dated 2008, 6 pages.

(Continued)

*Primary Examiner* — Tuan Ho
(74) *Attorney, Agent, or Firm* — Additon, Higgins, Pendleton & Ashe, P. A.

(57) ABSTRACT

There is set forth herein in one embodiment an image sensor array including a global shutter shared by first and second pixels. The global shutter can include a charge storage area having an associated shield for reducing charge build up on the charge storage area attributable to incident light rays. There is set forth herein in one embodiment an imaging apparatus having one or more configuration. The one or more configuration can include one or more of a configuration wherein a frame read out from an image sensor array has unbinned pixel values, a configuration wherein a frame read out from an image sensor array has binned pixel values corresponding to an M×N, M>=2, N>=2 arrangement of pixel values, and a configuration wherein a frame read out from an image sensor array has binned pixel values corresponding to a 1×N, N>=2 arrangement of pixel values.

27 Claims, 12 Drawing Sheets

(56) References Cited

U.S. PATENT DOCUMENTS

| | | |
|---|---|---|
| 5,278,642 A | 1/1994 | Danna et al. |
| 5,291,008 A | 3/1994 | Havens et al. |
| 5,305,122 A | 4/1994 | Hayashi et al. |
| 5,308,962 A | 5/1994 | Havens et al. |
| 5,337,361 A | 8/1994 | Wang et al. |
| 5,393,965 A | 2/1995 | Bravman et al. |
| 5,399,846 A | 3/1995 | Pavlidis et al. |
| 5,401,944 A | 3/1995 | Bravman et al. |
| 5,406,062 A | 4/1995 | Hasegawa et al. |
| 5,410,141 A | 4/1995 | Koenck et al. |
| 5,471,533 A | 11/1995 | Wang et al. |
| 5,504,322 A | 4/1996 | Pavlidis et al. |
| 5,513,264 A | 4/1996 | Wang et al. |
| 5,521,366 A | 5/1996 | Wang et al. |
| 5,527,262 A | 6/1996 | Monroe et al. |
| 5,541,777 A | 7/1996 | Sakamoto et al. |
| 5,572,006 A | 11/1996 | Wang et al. |
| 5,576,529 A | 11/1996 | Koenck et al. |
| 5,591,955 A | 1/1997 | Laser |
| 5,602,377 A | 2/1997 | Beller et al. |
| 5,602,379 A | 2/1997 | Uchimura et al. |
| 5,637,849 A | 6/1997 | Wang et al. |
| 5,646,390 A | 7/1997 | Wang et al. |
| 5,654,533 A | 8/1997 | Suzuki et al. |
| 5,662,586 A | 9/1997 | Monroe et al. |
| 5,691,773 A | 11/1997 | Wang et al. |
| 5,702,058 A | 12/1997 | Dobbs et al. |
| 5,702,059 A | 12/1997 | Chu et al. |
| 5,703,349 A | 12/1997 | Meyerson et al. |
| 5,714,745 A | 2/1998 | Ju et al. |
| 5,717,195 A | 2/1998 | Feng et al. |
| 5,739,518 A | 4/1998 | Wang |
| 5,756,981 A | 5/1998 | Roustaei et al. |
| 5,763,864 A | 6/1998 | O'Hagan et al. |
| 5,763,866 A | 6/1998 | Seo et al. |
| 5,770,847 A | 6/1998 | Olmstead |
| 5,773,810 A | 6/1998 | Hussey et al. |
| 5,783,811 A | 7/1998 | Feng et al. |
| 5,784,102 A | 7/1998 | Hussey et al. |
| 5,786,582 A | 7/1998 | Roustaei et al. |
| 5,786,586 A | 7/1998 | Pidhirny et al. |
| 5,793,033 A | 8/1998 | Feng et al. |
| 5,811,774 A | 9/1998 | Ju et al. |
| 5,811,784 A | 9/1998 | Tausch et al. |
| 5,811,828 A | 9/1998 | Laser |
| 5,814,801 A | 9/1998 | Wang et al. |
| 5,815,200 A | 9/1998 | Ju et al. |
| 5,818,023 A | 10/1998 | Meyerson et al. |
| 5,818,028 A | 10/1998 | Meyerson et al. |
| 5,821,518 A | 10/1998 | Sussmeier et al. |
| 5,831,254 A | 11/1998 | Karpen et al. |
| 5,834,754 A | 11/1998 | Feng et al. |
| 5,837,987 A | 11/1998 | Koenck et al. |
| 5,841,121 A | 11/1998 | Koenck |
| 5,877,487 A | 3/1999 | Tani et al. |
| 5,914,476 A | 6/1999 | Gerst, III et al. |
| 5,917,913 A | 6/1999 | Wang |
| 5,940,163 A | 8/1999 | Byrum |
| 5,949,052 A | 9/1999 | Longacre, Jr. et al. |
| 5,979,763 A | 11/1999 | Wang et al. |
| 5,986,297 A | 11/1999 | Guidash et al. |
| 6,010,070 A | 1/2000 | Mizuochi et al. |
| 6,010,073 A | 1/2000 | Bianchi |
| 6,019,286 A | 2/2000 | Li et al. |
| 6,042,012 A | 3/2000 | Olmstead et al. |
| 6,045,047 A | 4/2000 | Pidhirny et al. |
| 6,045,238 A | 4/2000 | Wheeler et al. |
| 6,053,407 A | 4/2000 | Wang et al. |
| 6,060,722 A | 5/2000 | Havens et al. |
| 6,062,475 A | 5/2000 | Feng |
| 6,073,851 A | 6/2000 | Olmstead et al. |
| 6,075,240 A | 6/2000 | Watanabe et al. |
| 6,102,295 A | 8/2000 | Ogami |
| 6,123,261 A | 9/2000 | Roustaei |
| 6,142,934 A | 11/2000 | Lagerway et al. |
| 6,152,368 A | 11/2000 | Olmstead et al. |
| 6,155,488 A | 12/2000 | Olmstead et al. |
| 6,155,491 A | 12/2000 | Dueker et al. |
| 6,157,027 A | 12/2000 | Watanabe et al. |
| 6,186,404 B1 | 2/2001 | Ehrhart et al. |
| 6,223,988 B1 | 5/2001 | Batterman et al. |
| 6,230,975 B1 | 5/2001 | Colley et al. |
| 6,234,394 B1 | 5/2001 | Kahn et al. |
| 6,254,003 B1 | 7/2001 | Pettinelli et al. |
| 6,262,804 B1 | 7/2001 | Friend et al. |
| 6,276,605 B1 | 8/2001 | Olmstead et al. |
| 6,298,176 B2 | 10/2001 | Longacre, Jr. et al. |
| 6,304,660 B1 | 10/2001 | Ehrhart et al. |
| 6,311,895 B1 | 11/2001 | Olmstead et al. |
| 6,311,896 B1 | 11/2001 | Mulla et al. |
| 6,315,203 B1 | 11/2001 | Ikeda et al. |
| 6,315,204 B1 | 11/2001 | Knighton et al. |
| 6,347,163 B2 | 2/2002 | Roustaei |
| 6,375,075 B1 | 4/2002 | Ackley et al. |
| 6,386,452 B1 | 5/2002 | Kawamura |
| 6,405,929 B1 | 6/2002 | Ehrhart et al. |
| 6,419,157 B1 | 7/2002 | Ehrhart et al. |
| 6,460,766 B1 | 10/2002 | Olschafskie et al. |
| 6,522,441 B1 | 2/2003 | Rudeen |
| 6,533,168 B1 | 3/2003 | Ching |
| 6,552,323 B2 | 4/2003 | Guidash et al. |
| 6,561,428 B2 | 5/2003 | Meier et al. |
| 6,575,367 B1 | 6/2003 | Longacre, Jr. |
| 6,598,797 B2 | 7/2003 | Lee |
| 6,621,598 B1 | 9/2003 | Oda |
| 6,637,658 B2 | 10/2003 | Barber et al. |
| 6,655,597 B1 | 12/2003 | Swartz et al. |
| 6,681,994 B1 | 1/2004 | Koenck |
| 6,695,209 B1 | 2/2004 | La |
| 6,714,239 B2 | 3/2004 | Guidash |
| 6,722,569 B2 | 4/2004 | Ehrhart et al. |
| 6,752,319 B2 | 6/2004 | Ehrhart et al. |
| 6,811,088 B2 | 11/2004 | Lanzaro et al. |
| 6,814,290 B2 | 11/2004 | Longacre |
| 6,821,810 B1 | 11/2004 | Hsiao et al. |
| 6,824,059 B2 | 11/2004 | Jam et al. |
| 6,832,725 B2 | 12/2004 | Gardiner et al. |
| 6,834,807 B2 | 12/2004 | Ehrhart et al. |
| 6,877,664 B1 | 4/2005 | Oliva |
| 6,880,759 B2 | 4/2005 | Wilde et al. |
| 6,889,904 B2 | 5/2005 | Bianculli et al. |
| 6,910,633 B2 | 6/2005 | Swartz et al. |
| 6,956,544 B2 | 10/2005 | Valliath et al. |
| 6,959,865 B2 | 11/2005 | Walczyk et al. |
| 6,976,626 B2 | 12/2005 | Schmidt et al. |
| 6,976,631 B2 | 12/2005 | Kashi et al. |
| 7,044,378 B2 | 5/2006 | Patel et al. |
| 7,055,747 B2 | 6/2006 | Havens et al. |
| 7,073,715 B2 | 7/2006 | Patel et al. |
| 7,083,098 B2 | 8/2006 | Joseph et al. |
| 7,086,596 B2 | 8/2006 | Meier et al. |
| 7,090,132 B2 | 8/2006 | Havens et al. |
| 7,111,787 B2 | 9/2006 | Ehrhart |
| 7,121,470 B2 | 10/2006 | McCall et al. |
| 7,128,266 B2 | 10/2006 | Zhu et al. |
| 7,148,923 B2 | 12/2006 | Harper et al. |
| 7,159,783 B2 | 1/2007 | Walczyk et al. |
| 7,219,841 B2 | 5/2007 | Biss et al. |
| 7,219,843 B2 | 5/2007 | Havens et al. |
| 7,222,789 B2 | 5/2007 | Longacre, Jr. et al. |
| 7,234,641 B2 | 6/2007 | Olmstead |
| 7,268,924 B2 | 9/2007 | Hussey et al. |
| 7,270,273 B2 | 9/2007 | Barber et al. |
| 7,270,274 B2 | 9/2007 | Hennick et al. |
| 7,276,025 B2 | 10/2007 | Roberts et al. |
| 7,277,562 B2 | 10/2007 | Zyzdryn |
| 7,287,696 B2 | 10/2007 | Attia et al. |
| 7,303,126 B2 | 12/2007 | Patel et al. |
| 7,459,668 B2 | 12/2008 | Mauritzson |
| 7,568,628 B2 | 8/2009 | Wang et al. |
| 7,611,060 B2 | 11/2009 | Wang et al. |
| 7,637,430 B2 | 12/2009 | Hawley et al. |
| 7,667,169 B2 | 2/2010 | Yang et al. |
| 7,683,306 B2 | 3/2010 | McKee |

(56) References Cited

U.S. PATENT DOCUMENTS

| | | | |
|---|---|---|---|
| 7,690,572 B2 | 4/2010 | Meier et al. | |
| 7,728,279 B2 | 6/2010 | Mauritzson | |
| 7,909,257 B2 | 3/2011 | Wang et al. | |
| 7,916,831 B2 | 3/2011 | Sun et al. | |
| 7,924,333 B2 | 4/2011 | Yin et al. | |
| 7,932,945 B2 | 4/2011 | Okano et al. | |
| 7,964,929 B2 | 6/2011 | Fan | |
| 7,989,749 B2 | 8/2011 | Yin et al. | |
| 7,994,464 B2 | 8/2011 | McKee | |
| 8,016,196 B2 | 9/2011 | Meier et al. | |
| 2001/0003346 A1 | 6/2001 | Feng | |
| 2002/0125317 A1 | 9/2002 | Hussey et al. | |
| 2002/0171745 A1 | 11/2002 | Ehrhart | |
| 2002/0179713 A1 | 12/2002 | Pettinelli et al. | |
| 2003/0004827 A1 | 1/2003 | Wang | |
| 2003/0019934 A1 | 1/2003 | Hunter et al. | |
| 2003/0034394 A1 | 2/2003 | Gannon et al. | |
| 2003/0062413 A1 | 4/2003 | Gardiner et al. | |
| 2003/0089775 A1 | 5/2003 | Yeakley et al. | |
| 2003/0102376 A1 | 6/2003 | Meier et al. | |
| 2003/0127519 A1 | 7/2003 | Ehrhart et al. | |
| 2003/0168512 A1 | 9/2003 | Longacre, Jr. et al. | |
| 2003/0197063 A1 | 10/2003 | Longacre, Jr. | |
| 2003/0201328 A1 | 10/2003 | Jam et al. | |
| 2003/0206150 A1 | 11/2003 | Hussey et al. | |
| 2003/0222147 A1 | 12/2003 | Havens et al. | |
| 2003/0226895 A1 | 12/2003 | Havens et al. | |
| 2004/0004128 A1 | 1/2004 | Pettinelli et al. | |
| 2004/0035933 A1 | 2/2004 | Havens et al. | |
| 2004/0155110 A1 | 8/2004 | Ehrhart et al. | |
| 2004/0174576 A1 | 9/2004 | Kamisuwa et al. | |
| 2004/0206825 A1 | 10/2004 | Schmidt et al. | |
| 2005/0001035 A1 | 1/2005 | Hawley et al. | |
| 2005/0041296 A1 | 2/2005 | Hsiao et al. | |
| 2005/0072847 A1 | 4/2005 | Barkan et al. | |
| 2005/0103864 A1 | 5/2005 | Zhu et al. | |
| 2005/0145698 A1 | 7/2005 | Havens et al. | |
| 2005/0161511 A1 | 7/2005 | Parker et al. | |
| 2005/0167507 A1 | 8/2005 | Swartz et al. | |
| 2005/0279836 A1 | 12/2005 | Havens et al. | |
| 2006/0011724 A1 | 1/2006 | Joseph et al. | |
| 2006/0043194 A1 | 3/2006 | Barkan et al. | |
| 2006/0113386 A1 | 6/2006 | Olmstead | |
| 2006/0119738 A1 | 6/2006 | Kido | |
| 2006/0163355 A1 | 7/2006 | Olmstead et al. | |
| 2006/0180670 A1 | 8/2006 | Acosta et al. | |
| 2006/0202036 A1 | 9/2006 | Wang et al. | |
| 2006/0202038 A1 | 9/2006 | Wang et al. | |
| 2006/0249581 A1 | 11/2006 | Smith | |
| 2006/0274171 A1 | 12/2006 | Wang | |
| 2006/0283952 A1 | 12/2006 | Wang | |
| 2007/0108284 A1 | 5/2007 | Pankow et al. | |
| 2007/0158428 A1 | 7/2007 | Havens et al. | |
| 2007/0164111 A1 | 7/2007 | Wang et al. | |
| 2007/0181692 A1 | 8/2007 | Barkan et al. | |
| 2007/0205272 A1 | 9/2007 | Daddabbo et al. | |
| 2007/0219417 A1 | 9/2007 | Roberts et al. | |
| 2007/0267501 A1 | 11/2007 | Jovanovski et al. | |
| 2008/0197387 A1 | 8/2008 | Itonaga et al. | |
| 2008/0204777 A1 | 8/2008 | Takematsu | |
| 2008/0223933 A1 | 9/2008 | Smith | |
| 2008/0296393 A1 | 12/2008 | Jovanovski et al. | |
| 2008/0315261 A1 | 12/2008 | McKee | |
| 2009/0046189 A1 | 2/2009 | Yin et al. | |
| 2009/0053848 A1 | 2/2009 | Fan | |
| 2009/0261443 A1 | 10/2009 | Noh et al. | |
| 2009/0274266 A1 | 11/2009 | Sun et al. | |
| 2009/0289169 A1 | 11/2009 | Yang et al. | |
| 2010/0044440 A1 | 2/2010 | Wang et al. | |
| 2010/0051786 A1 | 3/2010 | Lotto et al. | |
| 2010/0079646 A1 | 4/2010 | Yin et al. | |
| 2010/0092875 A1 | 4/2010 | Cho | |
| 2010/0140356 A1 | 6/2010 | Hawley et al. | |
| 2010/0141631 A1 | 6/2010 | McKee | |
| 2010/0148037 A1 | 6/2010 | Bogaerts et al. | |
| 2010/0230583 A1 | 9/2010 | Nakata et al. | |
| 2010/0245644 A1 | 9/2010 | Ellis-Monaghan et al. | |
| 2010/0309340 A1* | 12/2010 | Border et al. | 348/241 |
| 2011/0073923 A1 | 3/2011 | Tatani et al. | |
| 2011/0090190 A1 | 4/2011 | Lin | |
| 2011/0176042 A1 | 7/2011 | Kato et al. | |
| 2011/0176045 A1 | 7/2011 | Ahn et al. | |
| 2011/0181747 A1 | 7/2011 | Kido et al. | |
| 2011/0242351 A1 | 10/2011 | Shoji | |
| 2011/0248147 A1 | 10/2011 | McKee | |
| 2012/0293699 A1* | 11/2012 | Blanquart et al. | 348/296 |
| 2013/0113967 A1* | 5/2013 | Wang | 348/302 |

OTHER PUBLICATIONS

Mori, et al. IEEE Journal of Solid-State Circuits, 1/4-Inch 2-Mpixel MOS Image Sensor With 1.75 Transistors/Pixel, vol. 39, No. 12, dated Dec. 2004 (5 pages).

Bogaerts, et al. "CMOS image sensor with two-shared pixel and staggered readout architecture," International Image Sensor Workshop, dated Jun. 26, 2009 (4 pages).

Spuentrup et al. "Thin Film on CMOS Active Pixel Sensor for Space Applications," dated Oct. 13, 2008 (15 pages).

Bai et al. "Teledyne Imaging Sensors: Silicon CMOS imaging technologies for X-Ray, UV, Visible and near infrared," dated 2008 (16 pages).

* cited by examiner

US 8,629,926 B2

IMAGING APPARATUS COMPRISING IMAGE SENSOR ARRAY HAVING SHARED GLOBAL SHUTTER CIRCUITRY

CROSS REFERENCE TO RELATED APPLICATIONS

The present application is related to application Ser. No. 13/289,778 entitled "Apparatus Comprising Image Sensor Array Having Global Shutter Shared By A Plurality of Pixels" filed on the date of filing of the present application. The above application is incorporated herein by reference in its entirety.

FIELD OF THE INVENTION

The present invention relates in general to optical based apparatus, and particularly is related to an image sensor array based apparatus.

BACKGROUND OF THE INVENTION

Image sensor integrated circuits having multiple pixel image sensor arrays are commercially available. Imaging apparatus having image sensor arrays are available in a variety of forms, including digital cameras, mobile phones, surveillance equipment, medical diagnostic equipment, and indicia decoding apparatus. Imaging apparatuses are available in forms with indicia decoding capability and without decoding capability. Imaging apparatus with indicia decoding capability can be regarded as indicia reading apparatus.

Indicia reading apparatus for reading decodable indicia are available in multiple varieties. For example, minimally featured indicia reading apparatus devoid of a keyboard and display are common in point of sale applications. Indicia reading apparatus devoid of a keyboard and display are available in the recognizable gun style form factor having a handle and trigger button (trigger) that can be actuated by an index finger. Indicia reading apparatus having keyboards and displays are also available, often in a form where a keyboard and display is commonly located by the providing of a touch screen type display. Keyboard and display equipped indicia reading apparatus are commonly used in retail, shipping and warehouse applications. In a keyboard and display equipped indicia reading apparatus, a trigger button for actuating the output of decoded messages is typically provided in such locations as to enable actuation by a thumb of an operator. Indicia reading apparatus in a form devoid of a keyboard and display or in a keyboard and display equipped form are commonly used in a variety of data collection applications including retail point of sale applications, retail inventory applications, shipping applications, warehousing applications, security check point applications, patient care applications, and personal use, common where keyboard and display equipped indicia reading apparatus is provided by a personal mobile telephone having indicia reading functionality. Fixed mount indicia reading apparatus are also commonly available, e.g., installed under or near a countertop at a point of sale. Some indicia reading apparatus are adapted to read bar code symbols including one or more of one dimensional (1D) bar codes, stacked 1D bar codes, and two dimensional (2D) bar codes. Other indicia reading apparatus are adapted to read OCR characters while still other indicia reading apparatus are equipped to read both bar code symbols and OCR characters.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

SUMMARY OF THE INVENTION

There is set forth herein in one embodiment an image sensor array including a global shutter shared by first and second pixels. The global shutter can include a charge storage area having an associated shield for reducing charge build up on the charge storage area attributable to incident light rays. There is set forth herein in one embodiment an imaging apparatus having one or more configuration. The one or more configuration can include one or more of a configuration wherein a frame read out from an image sensor array has unbinned pixel values, a configuration wherein a frame read out from an image sensor array has binned pixel values corresponding to an M×N, M>=2, N>=2 arrangement of pixel values, and a configuration wherein a frame read out from an image sensor array has binned pixel values corresponding to a 1×N, N>=2 arrangement of pixel values.

DETAILED DESCRIPTION OF THE INVENTION

Figure 1:
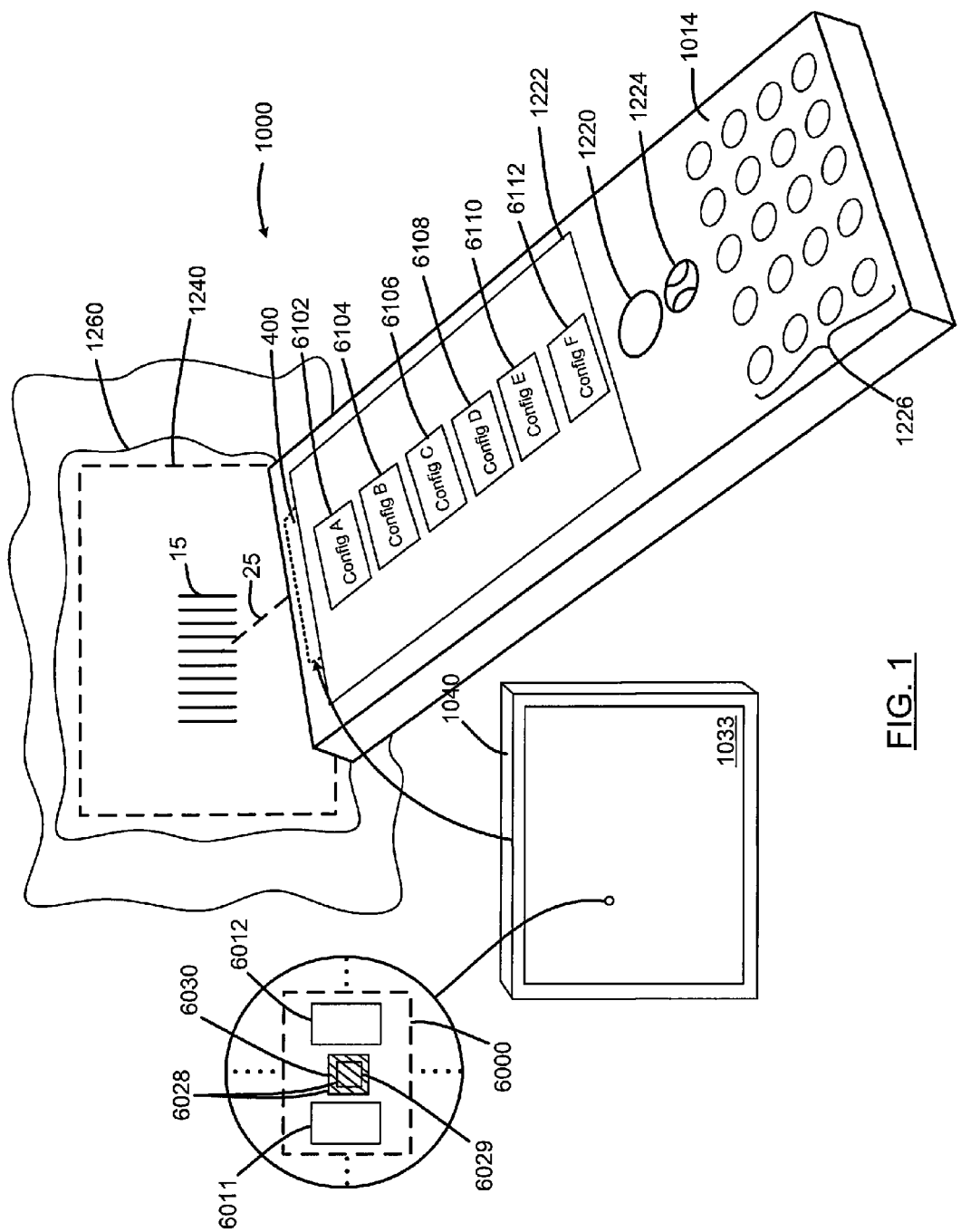
FIG. 1 is a schematic physical form view of an indicia reading apparatus in one embodiment.

Referring to FIG. 1, there is set forth herein an apparatus provided by an image sensor array 1033 that includes a global shutter 6028 shared by first and second pixels 6011 and 6012. Global shutter 6028 can include charge storage area 6029 and shield 6030. The charge storage area 6029 can include an associated opaque shield 6030 for reducing charge build up on storage area 6029 attributable to light being incident on charge storage area 6029. In one embodiment, image sensor array 1033 can include a plurality of cells 6000. Each cell 6000 can have a global shutter 6028 shared by first and second pixels. Global shutter 6028 can include charge storage area 6029 shared by first and second pixels, and an opaque shield 6030 associated with the charge storage area 6029. In one embodiment, image sensor array 1033 can be incorporated as an image sensor integrated circuit 1040. In one embodiment, image sensor array 1033 can be disposed in imaging apparatus 1000. Imaging apparatus 1000 can take on a variety of forms. In the embodiment of FIG. 1, imaging apparatus 1000 is shown as being provided by an image sensor based indicia reading apparatus. First and second pixels can be regarded as sharing a global shutter if there is an instance in the operation of array 1033 in which charge from the first pixel is transferred to the charge storage area of the global shutter and an instance in the operation of array 1033 in which charge from the second pixel is transferred to the charge storage area of the global shutter. The instances can be simultaneous or sequential.

An exemplary hardware platform for support of operations described herein with reference to an exemplary image sensor array based imaging apparatus 1000 is shown and described with reference to FIG. 2.

Imaging apparatus 1000 can include an image sensor 1032 comprising a multiple pixel image sensor array 1033 having pixels arranged in rows and columns of pixels, associated column circuitry 1034 and row circuitry 1035. Associated with the image sensor 1032 can be array amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. Image sensor integrated circuit 1040 can incorporate fewer than the noted number of components. In one example, image sensor integrated circuit 1040 can include image sensor 1032 without including elements 1035, 1036, 1037 and 1038.

In one example, image sensor integrated circuit 1040 can have an image sensor array 1033 that includes a plurality of cells, e.g., cells 6000. Cells of the plurality of cells can include first and second pixels 6011, 6012 sharing a common global shutter 6028. Global shutter 6028 can include a common charge storage area 6029 and opaque shield 6030. Opaque shield 6030 can reduce a charge build up on charge storage area 6029 attributable to light rays being incident on charge storage area 6029.

In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that can be captured utilizing an image sensor array 1033 incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively, prior to subjecting a frame for further processing interpolate pixel values intermediate of blue pixel positions utilizing blue pixel values. Apparatus 1000 in one aspect can process a raw frame captured utilizing an image sensor array 1033 having a color filter by subjecting the raw color frame to a de-mosaicing process. Color image data of a frame can be subjected to demosaicing by adding two additional color scale values for each pixel position of the frame. In the case image sensor array 1033 includes a Bayer pattern filter, red pixel values at green and blue pixel positions can be interpolated utilizing red pixel values at red pixel positions. Blue pixel values at red and green pixel positions can be interpolated utilizing blue pixel values at blue pixel positions. Further, green pixel values at red and blue pixel positions can be interpolated utilizing green pixel values at green pixel positions. An imaging subsystem of apparatus 1000 can include image sensor 1032 and a lens assembly 200 for focusing an image onto image sensor array 1033 of image sensor 1032.

In the course of operation of apparatus 1000, image signals can be read out of image sensor 1032, converted, and stored into a system memory such as RAM 1080. A memory 1085 of apparatus 1000 can include RAM 1080, a nonvolatile memory such as EPROM 1082 and a storage memory device 1084 such as may be provided by a flash memory or a hard drive memory. In one embodiment, apparatus 1000 can include CPU 1060 which can be adapted to read out image data stored in memory 1080 and subject such image data to various image processing algorithms. Apparatus 1000 can include a direct memory access unit (DMA) 1070 for routing image information read out from image sensor 1032 that has been subject to conversion to RAM 1080. In another embodiment, apparatus 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of apparatus 1000, imaging lens assembly 200 can be adapted for focusing an image of a decodable indicia 15 located within a field of view 1240 on a substrate, T, onto image sensor array 1033. A size in target space of a field of view 1240 of apparatus 1000 can be varied in a number of alternative ways. A size in target space of a field of view 1240 can be varied, e.g., by changing an apparatus to target distance, changing an imaging lens assembly setting, changing a number of pixels of image sensor array 1033 that are subject to read out. Imaging light rays can be transmitted about imaging axis 25. Lens assembly 200 can be adapted to be capable of multiple focal lengths and multiple planes of optimum focus (best focus distances).

Figure 4:
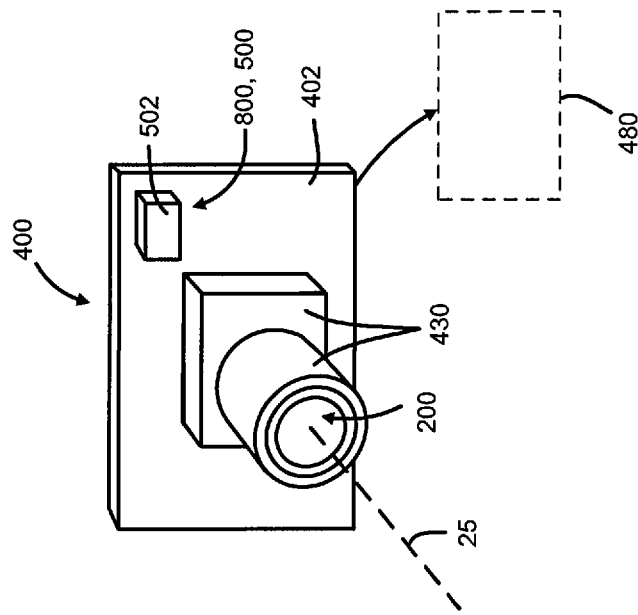
FIG. 4 is a perspective view of an imaging module.
Figure 3:
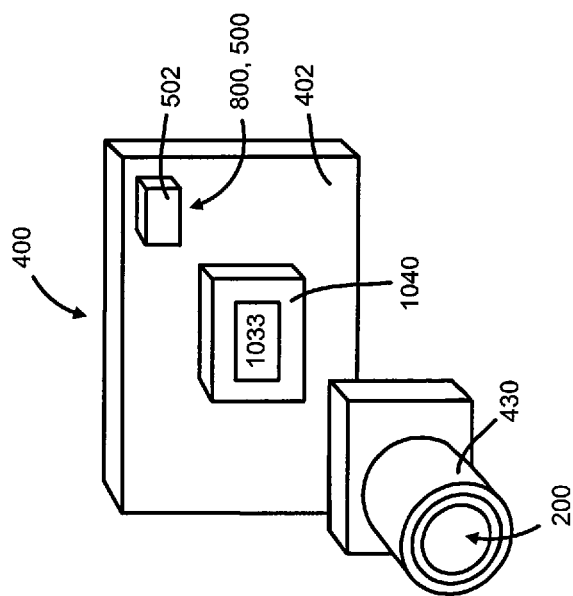
FIG. 3 is an exploded assembly perspective view of an imaging module.

Apparatus 1000 can include an illumination assembly 800 for illumination of target, T, which can be provided by a substrate and projection of an illumination pattern 1260. Illumination pattern 1260, in the embodiment shown can be projected to be proximate to but larger than an area defined by field of view 1240, but can also be projected in an area smaller than an area defined by a field of view 1240. Illumination assembly 800 can include a light source bank 500, comprising one or more light sources. A physical form view of an example of an illumination subsystem is shown in FIGS. 3-4. As shown in FIGS. 3-4, an imaging module 400 can be provided having a circuit board 402 carrying image sensor 1032 and lens assembly 200 disposed in support 430 disposed on circuit board 402. In the embodiment of FIGS. 3 and 4, illumination assembly 800 has a light source bank 500 provided by single light source 502. In another embodiment, light source bank 500 can be provided by more than one light source. Apparatus 1000 can also include an aiming assembly 600 for projecting an aiming pattern (not shown). Aiming assembly 600 which can comprise a light source bank can be coupled to aiming light source bank power input unit 1208 for providing electrical power to a light source bank of aiming assembly 600. Power input unit 1208 can be coupled to system bus 1500 via interface 1108 for communication with CPU 1060. An imaging module apparatus as shown in FIGS. 3 and 4 can be e.g., disposed in a hand held housing 1014 as shown in FIG. 1 or fixed positioned at fixed mounted at a scanning location 480 which can be provided, e.g., by a checkout counter or a ceiling above a conveyor belt.

Figure 2:
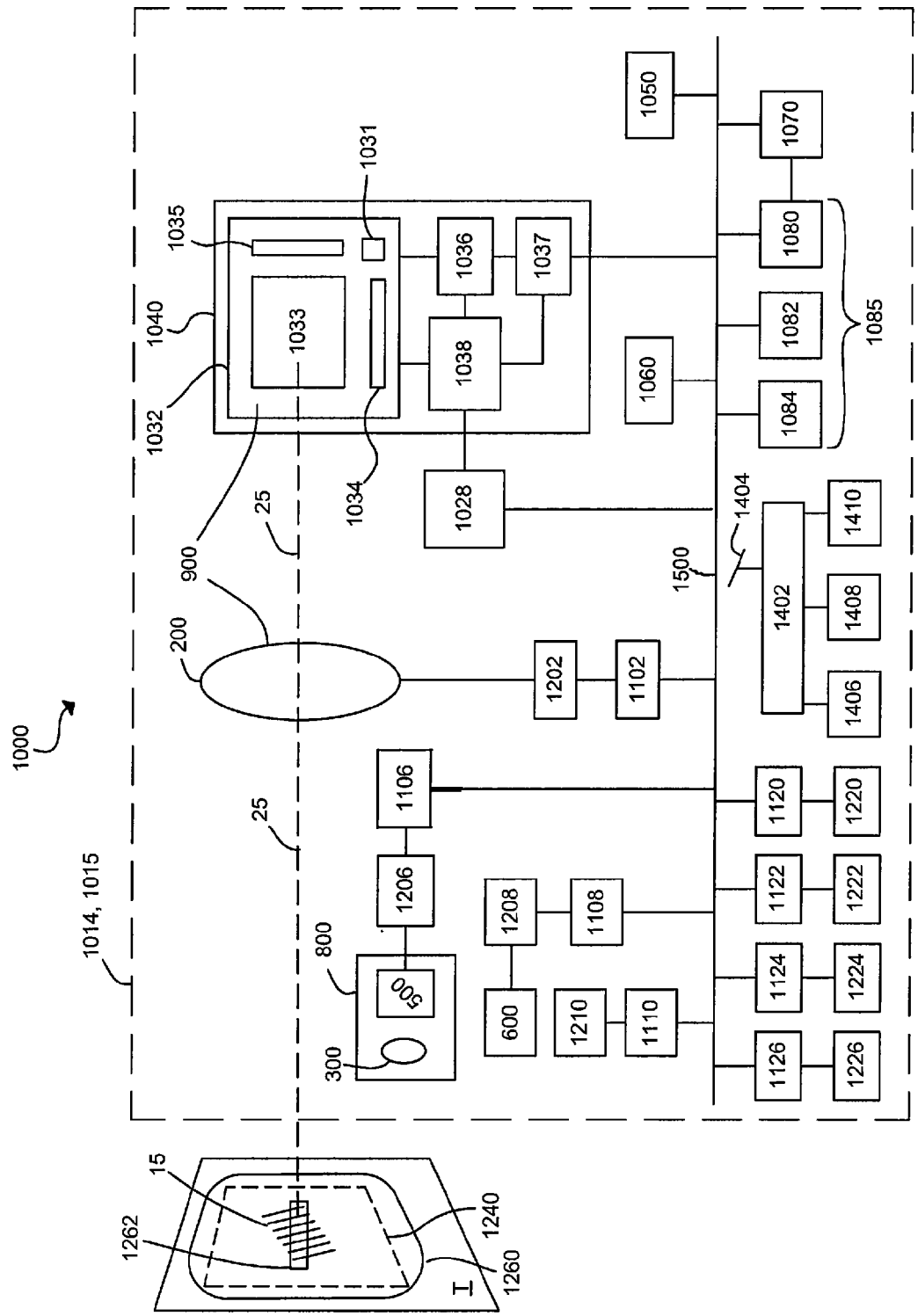
FIG. 2 is a block diagram of an indicia reading apparatus in one embodiment.

In one embodiment, illumination assembly 800 can include, in addition to light source bank 500, an illumination lens assembly 300, as is shown in the embodiment of FIG. 2. In addition to or in place of illumination lens assembly 300 illumination assembly 800 can include alternative light shaping optics, e.g. one or more diffusers, mirrors and prisms. In use, apparatus 1000 can be oriented by an operator with respect to a target, T, (e.g., a piece of paper, a package, another type of substrate) bearing decodable indicia 15 in such manner that illumination pattern 1260 is projected on a decodable indicia 15. In the example of FIG. 2, decodable indicia 15 is provided by a 1D bar code symbol. Decodable indicia 15 could also be provided by a 2D bar code symbol or optical character recognition (OCR) characters.

Referring to further aspects of apparatus 1000, lens assembly 200 can be controlled with use of electrical power input unit 1202 which provides energy for changing a plane of optimum focus of lens assembly 200. In one embodiment, an electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. Light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination assembly 800 for generating illumination pattern 1260.

In another aspect, apparatus 1000 can include power supply 1402 that supplies power to a power grid 1404 to which electrical components of apparatus 1000 can be connected. Power supply 1402 can be coupled to various power sources, e.g., a battery 1406, a serial interface 1408 (e.g., USB, RS232), and/or AC/DC transformer 1410.

Further regarding power input unit 1206, power input unit 1206 can include a charging capacitor that is continually charged by power supply 1402. Power input unit 1206 can be configured to output energy within a range of energization levels.

Apparatus 1000 can also include a number of peripheral devices including trigger 1220 which may be used to make active a trigger signal for activating frame readout and/or certain decoding processes. Apparatus 1000 can be adapted so that activation of trigger 1220 activates a trigger signal and initiates a decode attempt. Specifically, apparatus 1000 can be operative so that in response to activation of a trigger signal, a succession of frames can be captured by way of read out of image data from image sensor array 1033 (typically in the form of analog signals) and then storage of the image data (in the form of digitized N bit values) after conversion into memory 1080 (which can buffer one or more of the succession of frames at a given time). CPU 1060 can be operative to subject one or more of the succession of frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Apparatus 1000 can include various interface circuits for coupling various of the peripheral devices to system address/data bus (system bus) 1500, for communication with CPU 1060 also coupled to system bus 1500. Apparatus 1000 can include interface circuit 1028 for coupling image sensor timing and control circuit 1038 to system bus 1500, interface circuit 1102 for coupling electrical power input unit 1202 to system bus 1500, interface circuit 1106 for coupling illumination light source bank power input unit 1206 to system bus 1500, and interface circuit 1120 for coupling trigger 1220 to system bus 1500. Apparatus 1000 can also include a display 1222 coupled to system bus 1500 and in communication with CPU 1060, via interface 1122, as well as pointer mechanism 1224 in communication with CPU 1060 via interface 1124 connected to system bus 1500. Apparatus 1000 can also include range detector unit 1210 coupled to system bus 1500 via interface 1110. In one embodiment, range detector unit 1210 can be an acoustic range detector unit. Various interface circuits of apparatus 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array 1033 controls and illumination subsystem controls. Apparatus 1000 can comprise one or more communication interface 1050 in communication with CPU 1060 via system bus 1500. Communication interface 1050 can be a wireline or wireless communication interface, e.g., an IEEE 802.11 compliant communication interface or a Bluetooth communication interface.

A succession of frames of image data that can be captured and subject to the described processing can be full pixel resolution full frames (including pixel values corresponding to each pixel of image sensor array 1033 or a maximum number of pixels read out from image sensor array 1033 during operation of apparatus 1000). A succession of frames of image data that can be captured and subject to the described processing can also be reduced picture size frames comprising pixel values corresponding to less than a maximum and less than each pixel of image sensor array 1033. A succession of frames of image data that can be captured and subject to the described processing can also comprise a combination of full pixel resolution full frames and reduced picture size frames. A reduced picture size frame can be captured e.g., by performing binning of the values of adjacent pixels, by skipping readout of pixels of and/or by selectively reading out pixels one or more discrete coordinate areas of image sensor array 1033.

An isolated discrete coordinate area of image sensor array 1033 can be regarded as a "window." A frame having image data corresponding to one or more window can be regarded as a windowed frame. An example of a window is a center row of pixels. Another example of a window is N, N≤500 center rows of image sensor array 1033. A read out frame can comprise one or more window. Pixels corresponding to a full pixel resolution full frame can be read out for capture by selectively addressing pixels of image sensor 1032 having image sensor array 1033 corresponding to the full pixel resolution full frame. Pixels corresponding to a reduced picture size frame can be read out for capture by selectively addressing pixels of image sensor 1032 having image sensor array 1033 corresponding to the pixel positions of the reduced picture size. A reduced picture size frame can also be read out by binning pixels of the image sensor array 1033, i.e., by aggregating (e.g., summing or averaging) values of neighboring pixels. In one embodiment, a number of pixels subject to addressing and read out determine a picture size of a frame. A full pixel resolution full frame can be regarded as having a first relatively larger picture size and a windowed frame can be regarded as having a relatively smaller picture size relative to a picture size of a full pixel resolution full frame. A picture size of a windowed frame can vary depending on the number of pixels subject to addressing for readout and capture of a windowed frame, and also a number of binned pixels within a window. A windowed frame can be a full pixel resolution windowed frame wherein each pixel within the window is subject to read out without binning or a reduced resolution windowed frame wherein pixels within a window are skipped for purposes of read out or alternatively, binned. A reduced resolution full frame can be captured by reading out each pixel of image sensor array 1033 (i.e., reading out an image signal corresponding to a charge) with each pixel forming a bin with one or more adjacent pixels.

Apparatus 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of apparatus 1000 can be increased (and frame time decreased) by decreasing of a number of pixels subject to readout.

Further aspects of apparatus 1000 in one embodiment are described with reference again to FIG. 1. Trigger 1220, display 1222, pointer mechanism 1224, and keyboard 1226 can be disposed on a common side of a hand held housing 1014 as shown in FIG. 1. Display 1222 and pointer mechanism 1224 in combination can be regarded as a user interface of apparatus 1000. Display 1222 in one embodiment can incorporate a touch panel for navigation and virtual actuator selection in which case a user interface of apparatus 1000 can be provided by display 1222 incorporating the noted touch panel. A display incorporating a touch panel can be regarded as a "touch screen." A user interface of apparatus 1000 can also be provided by configuring apparatus 1000 to be operative to be reprogrammed by decoding of programming bar code symbols. A hand held housing 1014 for apparatus 1000 can in another embodiment be devoid of a display and can be in a gun style form factor. Imaging module 400 including image sensor array 1033 and imaging lens assembly 200 can be incorporated in hand held housing 1014. Apparatus 1000 in another embodiment can be devoid of housing 1014.

Figure 5:
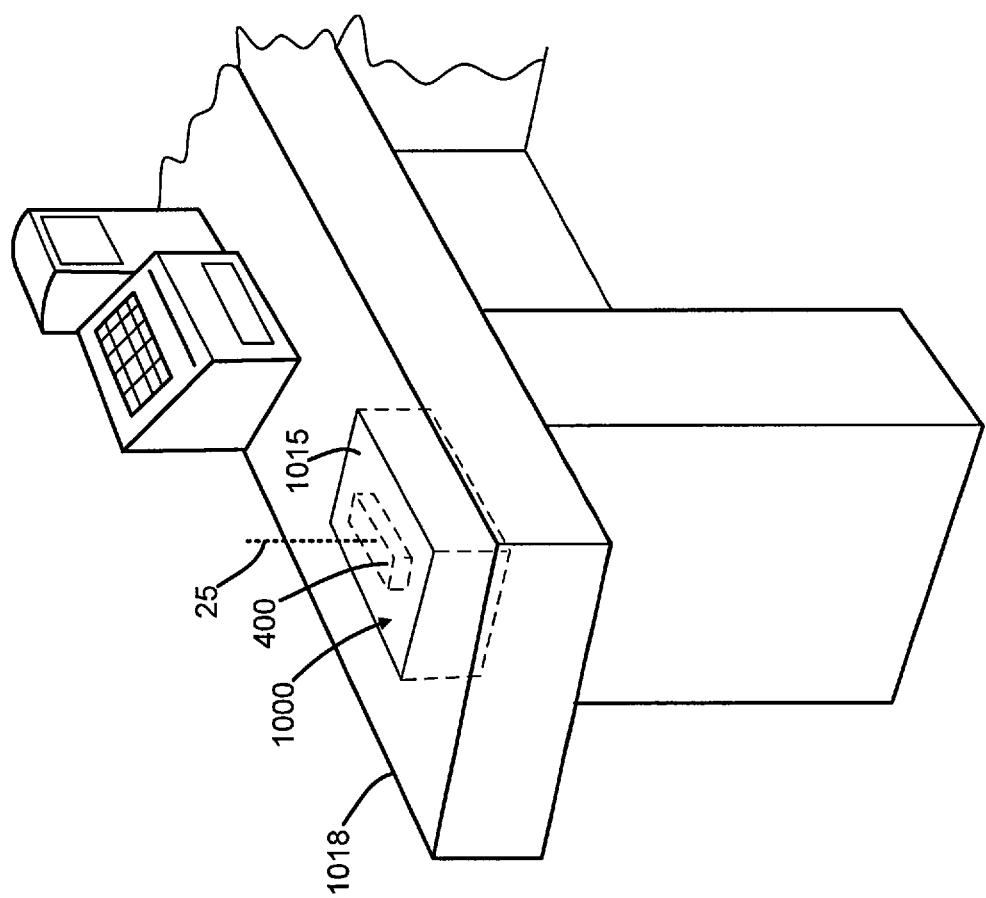
FIG. 5 is an implementation view illustrating an imaging apparatus provide by a fixed mount indicia reading apparatus mounted at a countertop at a point of sale checkout station.

In the implementation view of FIG. 5, indicia reading apparatus 1000 having fixed mount housing 1015 and imaging module 400 incorporated in housing 1015 is shown as being disposed at a point of sale. Indicia reading apparatus 1000 in the implementation view of FIG. 5 is a fixed position and fixed mount indicia reading apparatus that is mounted at a checkout counter. Indicia reading apparatus 1000 having fixed mount housing 1015 can also be mounted e.g., at a ceiling above a conveyor belt. In one embodiment, apparatus 1000 can be devoid of a housing such as housing 1014 or housing 1015 and can be provided, e.g., by and apparatus having the components of imaging module 400. Referring again to FIG. 2, FIG. 2 includes a dashed border 1014, 1015 indicating that components depicted within border 1014, 1015 can be disposed within a housing such as a hand held housing 1014 as depicted in FIG. 1 or a fixed mount housing 1015 as depicted in FIG. 5.

Figure 6:
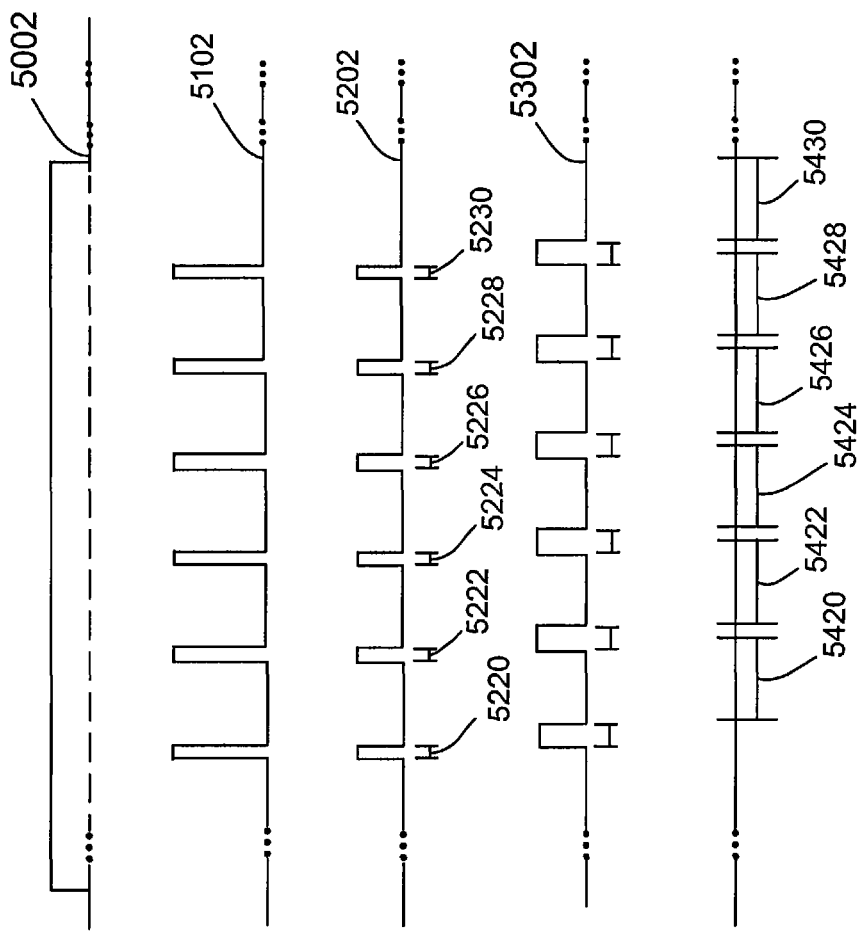
FIG. 6 is a timing diagram illustrating a method which can be performed by an imaging apparatus.

A timing diagram illustrating operation of the apparatus 1000 during performance of indicia reading operations is shown in FIG. 6. Referring to the timing diagram of FIG. 6, signal 5002 is a trigger signal which can be made active, e.g., via actuation of trigger 1220, via power up apparatus 1000, via receipt of a serial command from an external computer. Signal 5102 is an illumination energization level signal having varying energization levels. Signal 5202 is an exposure control signal having active states defining exposure periods and inactive states intermediate exposure periods. Signal 5302 is a readout control signal. When readout control signal 5302 is active, image data in the form of analog image signals can be read out of image sensor array 1033. For readout of pixel values of image sensor array 1033 as shown in FIG. 1, image signals read out can correspond to charge stored at charge storage areas constructed according to charge storage area 6029 of image sensor array 1033. Further regarding the timing diagram of FIG. 6, periods 5420-5430 are periods at which CPU 1060 can process frames of image data, e.g., for attempting to decode for decodable indicia. Apparatus 1000 can be operative so that prior to exposure period 5220 and after time $t_o$, apparatus 1000 can be capturing "parameter determination" frames that are processed for parameter determination that may or may not be subject to decode attempt.

Figure 7:
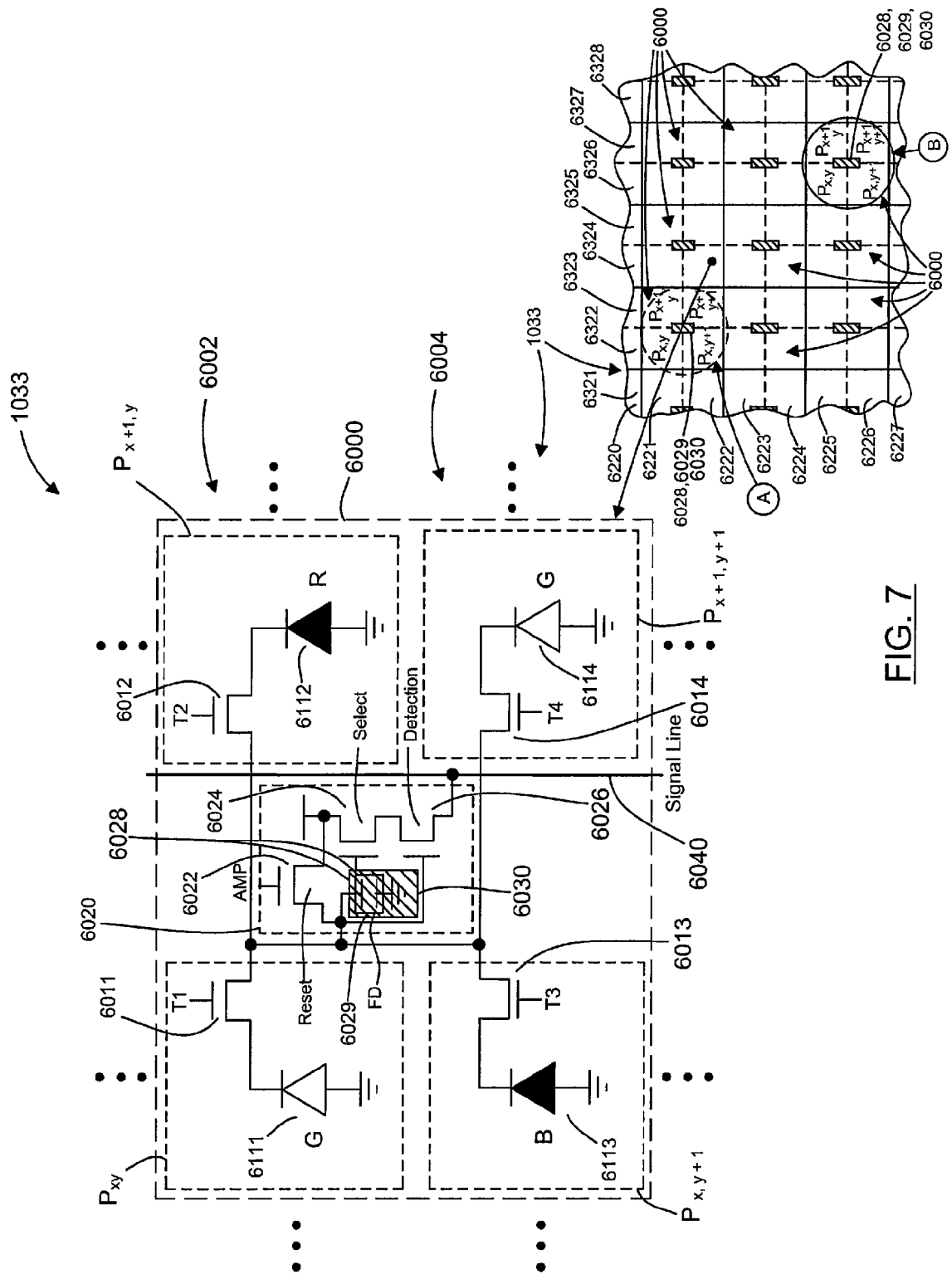
FIG. 7 is an electrical block diagram illustrating an embodiment of an image sensor array.

In a particular embodiment as set forth in FIG. 7, there is provided an image sensor array 1033 having a global shutter 6028 including charge storage area 6029 and opaque shield 6030 shared by a plurality of pixels including first and second pixels 6011, 6012 and third and fourth pixels 6013, 6014. A set of P, P>1 pixels sharing a common charge storage area circuit can be regarded as a cell. By providing an image sensor array in which charge storage area 6029 is shared by a plurality of pixels, the total number of transistors per pixel of the image sensor array 1033 can be reduced, resulting in increased fill factor and increased signal to noise ratio for the image sensor array 1033. In one embodiment, an opaque shield 6030 can be provided for shielding light so that light rays which would otherwise be incident on charge storage area 6029 are not incident on charge storage area 6029. Pixels of image sensor array 1033 that share a common charge storage area 6029 can be e.g., Bayer pattern color pixels or monochrome pixels. Apparatus 1000 can include a timing and control circuit 1038 that enables several configurations, including: (a) rolling reset (shutter) configuration; (b) 2×2 binning global shutter configuration; (c) 1×2 binning global shutter interlacing configuration; (d) 2×2 binning rolling reset configuration; (e) 1×2 binning rolling reset configuration (f) a 1×N binning global shutter configuration.

Referring to image sensor array 1033, image sensor array 1033, as illustrated in the embodiment of FIG. 7, can include a repeating pattern of cells 6000. Cells 6000 can be arranged in a plurality of rows and columns of cells, and can be characterized by a charge storage area 6029 shared by two or more pixels within the cell. As each cell 6000 can include first and second rows and first and second columns of pixels aligned with one or more adjacent cells as illustrated in FIG. 7 to define rows and columns of adjacent cells, image sensor array 1033 as shown in FIG. 7 can be regarded as having a plurality of rows e.g. rows 6220, 6221, 6222, 6223, 6224, 6225, 6226, 6227 and columns e.g., columns 6321, 6322, 6323, 6324, 6325, 6326, 6327, 6328 of pixels.

In one example, cells of a repeating pattern of cells can have the elements as shown in FIG. 7. In the diagram of FIG. 7, a first row of pixels 6002 includes green and red pixels, G, R and a second row of pixels 6004 includes blue and green pixels, B and G. Pixels $P_{x,y}$, $P_{x+1,y}$, $P_{x,y+1}$, and $P_{x+1,y+1}$ can include respective photodiodes 6111, 6112, 6113, 6114 and respective transfer transistors 6011, 6012, 6013, 6014. The pixels $P_{x,y}$, $P_{x+1,y}$, $P_{x,y+1}$, and $P_{x+1,y+1}$, in the embodiment of FIG. 7 can share a common global shutter 6028 comprising a common charge storage area 6029 and opaque shield 6030. In the embodiment of FIG. 7, charge storage area 6029 can be provided as part of an amplifier circuit 6020. Pixel amplifier circuit 6020 in one embodiment can include a charge storage area 6029 provided by a floating diffusion, a reset transistor 6022, a select transistor 6024 and a detection transistor 6026. Image sensor array 1033 can include an opaque shield 6030. Opaque shield 6030 can restrict light from being incident on charge storage area 6029 which can be provided by a floating diffusion thereby reducing an amount of charge build up on charge storage area 6029 attributable to incident light.

For output of a signal responsive to light incident on a certain pixel, the pixel's photodiode 6111 can be exposed during an exposure period, a charge accumulated on the pixel's photodiode 6111 during the exposure period can be transferred to the storage area 6029 at a transfer time, and a signal can be read out from storage area 6029 at a readout time. The read out signal can correspond to a charge stored at the charge storage area 6029. In some instances the transfer time and readout time can be simultaneous. In other instances the transfer time and the readout time can be sequential with the readout time occurring after the transfer time. It was determined in the development of array 1033 that where readout is sequential to transfer and without the presence of opaque shield 6030, light incident on charge storage area 6029 during the delay between transfer and readout would potentially cause a signal readout from a charge storage area 6029 to be non-representative of light incident on one or more pixel subject to readout.

For initiation of exposure of photodiode 6111 of pixel $P_{x,y}$ relative to the example of FIG. 7, transfer transistor 6011 and reset transistor 6022 can be turned on and off in a manner so that they have simultaneous on times. For termination of exposure of pixel $P_{x,y}$ transfer transistor 6011 can be turned on and off. Turning on transfer transistor 6011 can terminate exposure and transfer charge accumulated at photodiode 6111 to charge storage area 6029. For readout of the charge stored at storage area 6029 select transistor 6024 can be turned on. If select transistor 6024 is on at the time transfer transistor 6011 is turned on for transfer, transfer and readout can be simultaneous. The transfer of charges from more than one photodiode e.g., photodiode 6111 and photodiode 6113 simultaneously can result in an aggregate charge being stored at charge storage area 6029. The aggregate charge can be regarded as a binned pixel value. A charge stored at charge storage area 6029 can be responsive to light incident on one or more pixel of image sensor array 1033. A binned pixel value can be defined when the charge stored at charge storage area 6029 is responsive to light incident on more than one pixel of image sensor array, e.g., 2 pixels, 3 pixels, 4 pixels, and so on. A binned pixel value can represent light not at the spatial area of a single pixel but a spatial area defined by a arrangement of adjacent pixels e.g., pixel $P_{x,y}$, $P_{x,y+1}$. An arrangement of adjacent pixels subject to simultaneous charge transfer for binning can also be regarded as binned pixels. An arrangement of adjacent pixels subject to simultaneous charge transfer for binning can be regarded as a superpixel. An aggregate charge stored at a common charge storage area 6029 of image sensor array 1033 can comprise the aggregate charge of two or more, i.e., at least first and second pixels. In one example an aggregate charge stored at a common charge storage area can comprise the aggregate charge of 2 pixels; in another example 3 pixels, in another example 4 pixels, and so on.

Global shutter 6028 including charge storage area 6029 and shield 6030 can facilitate global shutter operation. An image sensor array 1033 having one or more global shutter 6028 can be capable of global shutter operation. For global shutter operation in one embodiment pixels of each row of pixels of image sensor array 1033 subject to readout can have common exposure initiation and termination times. Rows of pixels subject to readout for readout of a frame can include a first set of rows defining a first row of cells and a second set of rows defining a second row of cell. Further for global shutter operation, at the common exposure termination times, charges stored at pixel photodiodes of image sensor array 1033 subject to readout can be transferred to a global shutter charge storage area 6029 shared by a plurality of pixels. Further for global shutter operation global shutter shield 6030 can restrict unwanted charge buildup at a charge storage area 6029 attributable to light rays being incident on charge storage area 6029 prior to readout of image data representative of light incident on a pixel or an arrangement of adjacent pixels of array 1033. For global shutter operation read out of image data from various global shutter charge storage areas 6029 of image sensor array can be sequential, with shield 6030 of the various charge storage areas storing charges for readout restricting charge buildup attributable to light rays incident on charge storage areas so that read out pixel values are representative of light incident on a pixel or set of pixels of image sensor array. Image sensor array 1033 can include global shutter circuitry, the global shutter circuitry including one or more global shutter 6028.

Apparatus 1000 can include a plurality of alternative configurations, including (a) a rolling reset configuration, (b) a 2×2 binning global shutter configuration, (c) a 2×2 binning rolling reset configuration, (d) a 1×2 binning global shutter interlacing configuration, (e) a 1×2 binning rolling reset configuration and (f) a 1×4 binning global shutter configuration. Additional configurations of apparatus 1000 can include one or more of configurations (b) though (f) with different bin size designators.

According to (a) a rolling reset configuration, exposure of pixels of alternating rows of image sensor array 1033 can be initiated sequentially and pixel values making up a frame of image data can be read out with full pixel resolution (a number of pixel values read out can equal a number of pixels of the image sensor array 1033 addressed for readout).

According to (b) a 2×2 binning global shutter configuration, exposure of pixels of alternating rows of cells and in one embodiment each row of pixels of image sensor array 1033 can be initiated simultaneously and image data pixel values making up a frame of image data can be read out with reduced resolution in both the X (pixel position row) and Y (pixel position column) dimensions, with a pixel value being read out for each of several 2×2 bins of adjacent pixels. Where pixels are binned, image signals of the various pixels of the bin are aggregated (e.g., summed or averaged) so that during readout of a frame a single pixel value is read out for the bin. In a 2×2 binning global shutter configuration, exposure of pixels of different rows of a cell (and row of pixels of array 1033) can be initiated simultaneously.

According to (c) a 2×2 binning rolling reset configuration, exposure of pixels of alternating rows of cells of image sensor array 1033 can be initiated sequentially and pixel values making up a frame of image data can be read out with reduced resolution in both the X (pixel position row) and Y (pixel position column) dimensions, with a pixel value being read out for each of several 2×2 bins of adjacent pixels.

According to (d) a 1×2 binning global shutter interlacing configuration, exposure of pixels of alternating rows of cells and in one embodiment each row of cells of image sensor array 1033 can be initiated simultaneously and pixel values making up a frame of image data can be read out with reduced resolution in the Y (pixel position column) dimension with no reduction in resolution in the X dimension, with a pixel value being read out for each of several 1×2 bins of adjacent pixels. In a 1×2 binning global shutter interlacing configuration, exposure of pixels of different rows of a cell (and of array 1033) can be initiated simultaneously.

According to (e) a 1×2 binning rolling reset configuration, exposure of pixels of alternating rows of cells of image sensor array 1033 can be initiated sequentially and pixel values making up a frame of image data can be read out with reduced resolution in the Y (pixel position column) dimension with no reduction in resolution in resolution the X dimension, with a pixel value being read out for each of several 1×2 bins of adjacent pixels.

According to (f) a 1×4 binning global shutter configuration, exposure of pixels of a plurality of rows of cells of image sensor array 1033 and in one embodiment each row of bins of image sensor array 1033 can be initiated simultaneously and pixel values making up a frame of image data can be read out with reduced resolution in the Y (pixel position column) dimension with no reduction in resolution in the X dimension, with a pixel value being read out for each of several 1×4 bins of adjacent pixels. In a 1×4 binning global shutter configuration, exposure of pixels of different rows of a cell (and rows of pixels of array 1033) can be initiated simultaneously.

In the development of apparatus 1000, it was observed that currently available CMOS global shutter image sensor arrays consume 5 to 6 transistors per pixel. Thus there is required a relatively large pixel size for implementation with acceptable fill factor for many applications. For a commercially available 5 Mpx CMOS sensor, with a pixel size of 1.75 um to 2.2 um, challenges exist with respect to arranging 5 to 6 transistors per pixel and still providing a pixel fill factor yielding an acceptable signal to noise ratio (SNR).

Further description of the noted configurations is presented herein below:

(a) rolling reset (shutter) configuration:

Referring FIG. 7, there are two rows of pixels: the Nth row consists of green and red pixels, G and R and N+1th row consists of pixel blue and green pixels, B and G. Operating in accordance with a rolling reset configuration, timing and control circuit 1038 for controlling image sensor array 1033 can generate the timing control as shown in FIG. 8 for operation in accordance with the rolling reset configuration, which can be regarded as a rolling shutter configuration.

Exposure of the Nth row 6002 can be initiated by turning on and off transfer transistors 6011 and 6012 and reset transistors 6022 in a manner that the transfer transistors 6011 and 6012 and reset transistor 6022 have simultaneous on times. Terminating exposure of a pixel e.g., pixel $P_{x,y}$ can be performed by turning on a pixel transfer transistor, e.g., transfer transistor 6011 to transfer charge accumulated at the pixel photodiode 6111 to a charge storage area e.g., charge storage area 6029. Prior to transfer, reset transistor 6022 can be turned on and off to remove charge from charge storage area 6029. The presence of shield 6030 can reduce the amount of charge buildup at charge storage area 6029 prior to the turning on and off of reset transistor 6022 for charge transfer. Exposure of pixels of the Nth row can be terminated sequentially. In the example explained with reference to the timing diagram of FIG. 8, select transistor 6024 controlling readout can be activated simultaneously with the activation of a transfer transistor for transferring charge to storage area 6029. Accordingly, readout can be simultaneous with charge transfer.

Figure 8:
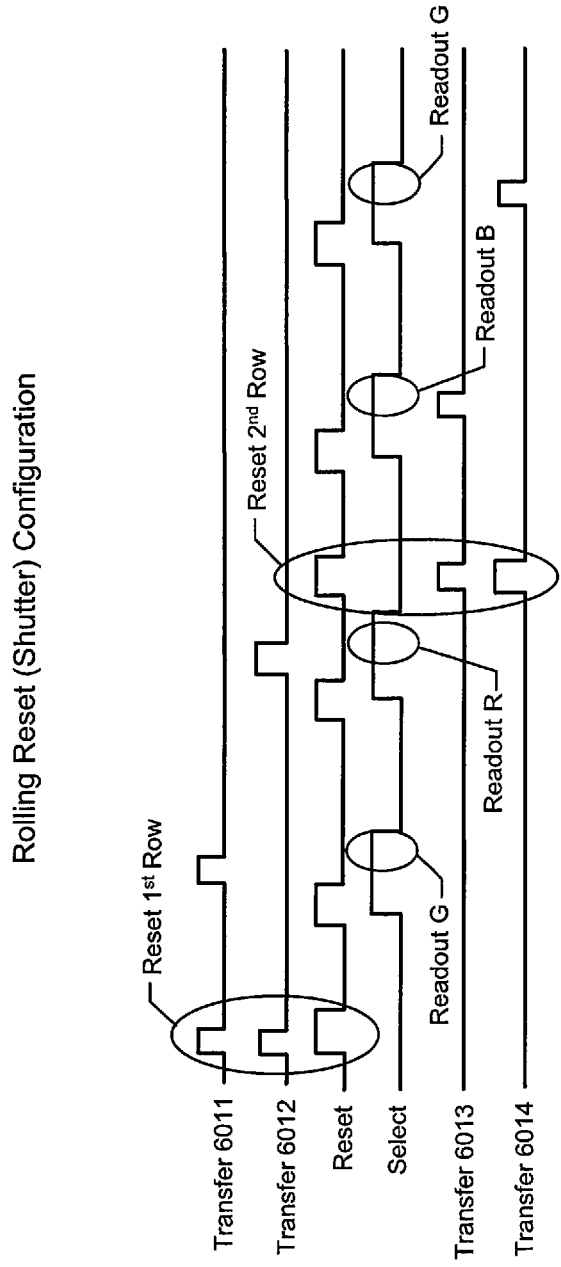
FIG. 8 is a timing diagram illustrating operation of an apparatus according to a rolling reset (shutter) configuration.

As indicated by the timing diagram of FIG. 8, exposure and readout of pixels of row N+1 can be sequential to the exposure and readout of pixels of row N. Exposure transfer and readout can be performed over a larger area of the array 1033 in the manner depicted for the cell 6000 shown in FIG. 7 with reference to the timing diagram of FIG. 8. In a rolling reset configuration (rolling shutter configuration) each pixel subject to readout can be subject to exposure termination at the time of readout.

(b) 2×2 binning global shutter configuration:

Referring FIG. 7, four pixels belong to a 2×2 cell 6000 which consists of pixels $P_{x,y}$, $P_{x+1, y}$, $P_{x, y+1}$, and $P_{x+1, y+1}$. Timing and control circuit 1038, operating according to the 2×2 binning global shutter configuration can generate the timing control as shown in FIG. 9 to perform the 2×2 binning global shutter configuration.

For operating in a binning rolling reset configuration, exposure of each pixel of a cell subject for readout and each cell of an array 1033 subject to readout can be initiated and terminated simultaneously. For simultaneous exposure initiation of pixels $P_{x,y}$, $P_{x+1, y}$, $P_{x, y+1}$, and $P_{x+1, y+1}$ transfer transistors 6011, 6012, 6013 and 6014 and reset transistor 6022 can be turned on and off in a manner so that they have simultaneously on periods as is indicated by the timing diagram of FIG. 9. For simultaneous exposure termination of pixels $P_{x,y}$, $P_{x+1, y}$, $P_{x, y+1}$, and $P_{x+1, y+1}$ and transfer of charge from respective photodiode 6111, 6112, 6113, 6114 to charge storage area 6029 transfer transistors 6011, 6012, 6013 and 6014 and can be turned on simultaneously subsequent to a turning on and off of reset transistor 6022 for clearing charge from charge storage area 6029. Because charges from multiple pixels can be transferred simultaneously, a resulting charge at charge storage area 6029 can be an aggregate charge that defines a binned pixel value indicative of light over the spatial area delimited by the combination of pixels $P_{x,y}$, $P_{x+1, y}$, $P_{x, y+1}$, and $P_{x+1, y+1}$.

Figure 9:
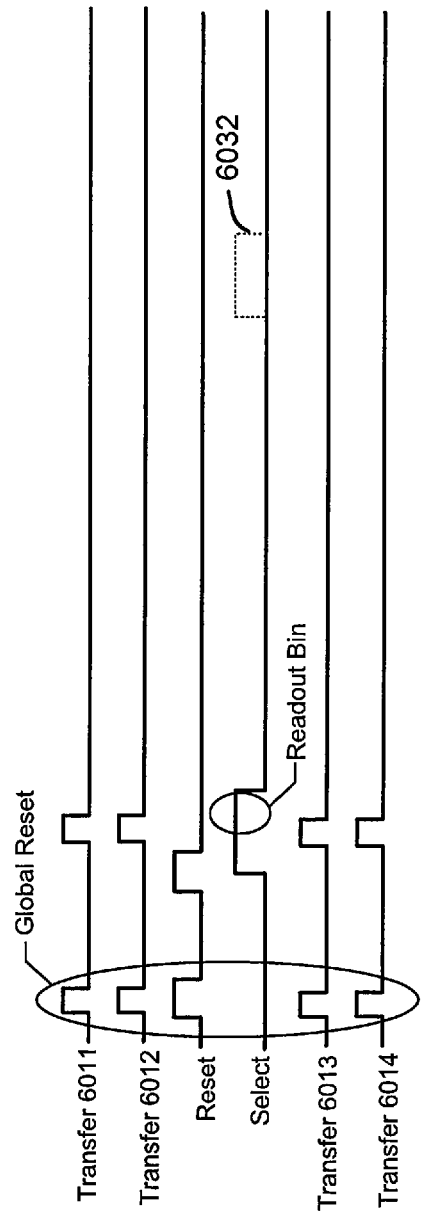
FIG. 9 is a timing diagram illustrating operation of an apparatus according to a 2×2 binning global shutter configuration.

Exposure transfer and readout can be performed over a larger area of the array 1033 in the manner depicted for the cell 6000 shown in FIG. 7 with reference to the timing diagram of FIG. 9. In a 2×2 binning global shutter configuration each cell (and each pixel of each cell) subject to readout can be subject to simultaneous exposure initiation and simultaneous exposure termination so that each pixel of image sensor array 1033 subject to readout has a common exposure period). Readout of pixel values $P_{x+1, y+1}$ can be sequential. While a 2×2 "bin" of pixels is specifically described, image sensor array 1033 can be configured so that bins can be provided in alternative dimensions, e.g., M×N, M≥1, N≥1, wherein at least one of M≥2 or N≥2 in accordance with a binning global shutter configuration. In the timing diagram of FIG. 9, readout of an image signal from charge storage area 6029 is depicted as being simultaneous with charge transfer as is indicated by the select transistor 6024 being on at the time of charge transfer. However, it will be understood that for other cells of an image sensor array 1033 readout may not be simultaneous with charge transfer. For another cell of image sensor array 1033 select transistor 6024 can be turned on at the period indicated by dashed in period 6032, with all other timing being the same as depicted in FIG. 9. During the delay between transfer of charge to a charge storage area 6029 constructed in the manner charge storage area 6029 and the readout of a signal from the charge storage area a shield constructed in the manner of shield 6030 can be preventing light from being incident on the charge storage area thus reducing a buildup of charge on the charge storage area 6029.

In the 2×2 binning global shutter configuration, pixels of image sensor array 1033 subject to readout can be subject to simultaneous exposure initiation and termination, with pixel values being read out defined by aggregate charges from multiple pixels. When exposure of all pixels of image sensor array 1033 subject to readout is initiated and terminated simultaneously, an overall frame exposure time is reduced, rendering a captured frame less likely to include motion blur defect. With shorter overall frame exposure time an illumination on time for illumination assembly 800 where apparatus includes illumination assembly 800 can be reduced, reducing power consumption.

There is set forth herein with reference to FIG. 7 an apparatus comprising an image sensor array 1033 having a first arrangement of adjacent pixels (location A) including a first pixel $P_{x,y}$ and a second pixel $P_{x,y+1}$, the first pixel and the second pixel of the first set of adjacent pixels sharing a first common global shutter 6028 having a first charge storage area 6029, wherein the image sensor array 1033 has a second arrangement of adjacent pixels (location B) including a first pixel $P_{x,y}$ and a second pixel $P_{x,y+1}$, the first pixel and the second pixel of the second set of adjacent pixels sharing a second global shutter 6028 having a second common charge storage area 6029, wherein the first pixel and the second pixel of the first arrangement of adjacent pixels (location A) are disposed in first and second rows of the image sensor array respectively, and wherein the first pixel and the second pixel of the second arrangement of adjacent pixels (location B) are disposed in third and fourth rows of the image sensor array respectively, wherein the image sensor array is controlled so that each of the first pixel and the second pixel of the first arrangement of adjacent pixels (location A) and each of the first pixel and the second pixel of the second arrangement of adjacent pixels (location B) have common exposure initiation and termination times, wherein the image sensor array 1033 is further controlled so that readout of an image signal corresponding to a charge stored on the second common charge storage area 6029 (location B) is performed sequentially relative to readout of an image signal stored on the first common charge storage area 6029 (location A).

(c) 2×2 binning rolling reset configuration:

In a 2×2 binning rolling reset configuration operation of image sensor array 1033 can be in the manner of the 2×2 binning global shutter configuration except that instead of cells subject to readout being subject to simultaneous exposure initiation and termination, and sequential readout, cells subject to readout can be subject to sequential exposure initiation, sequential exposure termination (by charge transfer) and sequential readout. While a 2×2 "bin" of pixels is specifically described, image sensor array 1033 can be configured so that bins can be provided in alternative dimensions, e.g., M×N, M≥1, N≥1, wherein at least one of M≥2 or N≥2 in accordance with a binning rolling reset configuration.

Figure 10:
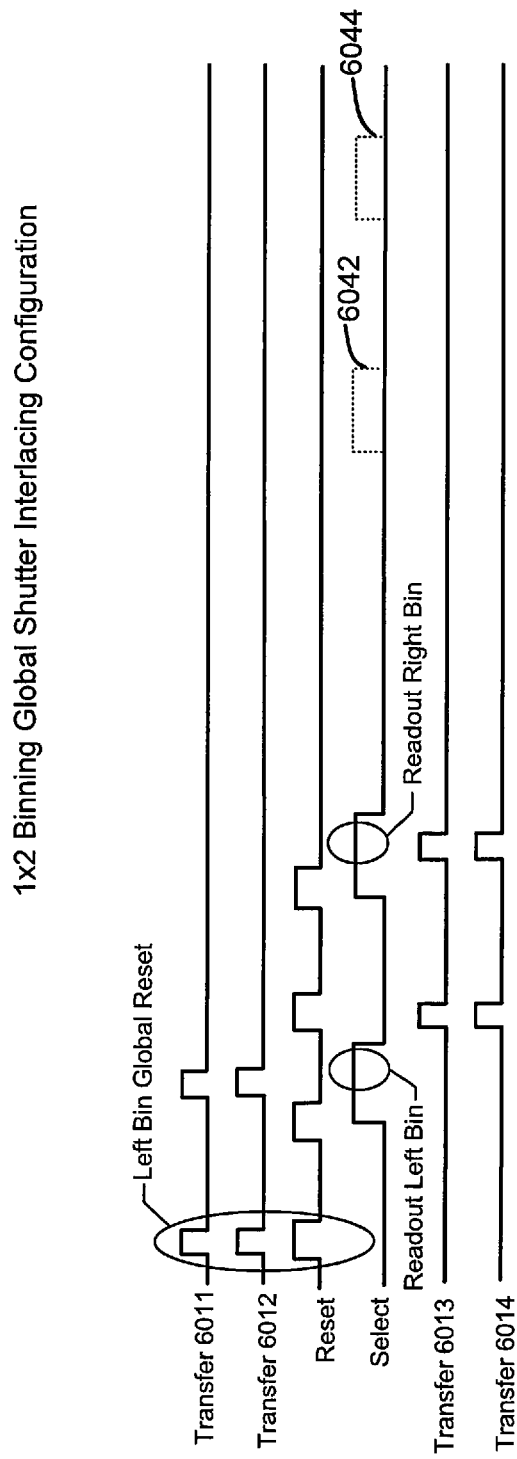
FIG. 10 is a timing diagram illustrating operation of an apparatus in accordance with a 1×2 binning global shutter interlacing configuration.

(d) 1×2 binning global shutter interlacing configuration:

Referring to FIG. 7, under one exemplary control, four pixels $P_{x,y}$, $P_{x+1,y}$, $P_{x,y+1}$, and $P_{x+1,y+1}$ belong to a 2×2 cell of pixels which share a common global shutter 6028 having a charge storage area 6029 and an opaque shield. For operating in accordance with a 1×2 binning global shutter interlacing configuration, timing and control circuit 1038 can generate the timing control as shown in FIG. 10. While a 1×2 "bin" of pixels is specifically described, image sensor array 1033 can be configured so that bins can be provided in alternative dimensions, e.g., 1×N, N≥2 in accordance with a binning global shutter interlacing configuration.

For operation in accordance with a 1×2 binning global shutter interlacing configuration with reference to cell 6000, left side pixels $P_{x,y}$, $P_{x,y+1}$ can be subject to simultaneous exposure initiation and termination (by charge transfer) and readout and subsequently thereto right side pixels $P_{x+1,y}$, $P_{x+1,y+1}$ can be subject to simultaneously exposure initiation and exposure termination (by charge transfer) and readout.

For simultaneously initiating exposure of left pixels, transfer transistors 6011, 6013 and reset transistor 6022 can be turned on and off in a manner as to have simultaneous on times. For simultaneously terminating exposure of left pixels $P_{x,y}$, $P_{x,y+1}$ transfer transistors 6011, 6013 can be simultaneously turned on and off subsequent to a turning on and off of reset transistor 6022 for clearing charge from charge storage area 6029. As charges from photodiode 6111 and photodiode 6113 will thus be transferred simultaneously, their charges will be aggregated to define a binned pixel value representative of light over the spatial area delimited by the combination of pixel $P_{x,y}$ and pixel $P_{x,y+1}$. For simultaneously initiating exposure of right pixels $P_{x+1,y}$, $P_{x+1,y+1}$ transfer transistors 6012, 6014 and reset transistor 6022 can be turned on and off in a manner so that they have simultaneous on periods. For simultaneously terminating exposure of left pixels $P_{x,y}$, $P_{x,y+1}$ transfer transistors 6012, 6014 can be turned on and off subsequent to a turning off of reset transistor 6022 for clearing charge from charge storage areas area 6029. The charges from photodiode 6112 and photodiode 6114 being transferred simultaneously their charges will be aggregated to define a binned pixel value representing light over the spatial area delimited by the combination of pixel $P_{x+1,y}$ and pixel $P_{x+1,y+1}$.

Exposure transfer and readout can be performed over a larger area of the array 1033 in the manner depicted for the cell 6000 shown in the transistor view portion of FIG. 7. with reference to the timing diagram of FIG. 10. In a 1×2 binning global shutter interlacing configuration, left pixels of each cell (and each pixel of each cell) subject to readout can be subject to simultaneous exposure initiation and termination so that each left pixel of each 2×2 cell of image sensor array 1033 subject to readout has a common exposure period. Each cell (and each pixel of each cell) subject to readout can be subject to simultaneous exposure initiation and termination so that each left pixel of each 2×2 cell of image sensor array 1033 subject to readout has a common exposure period. The right pixel common exposure period (as indicated by the time between transfer transistor active periods) can be sequential to the left pixel common exposure period as depicted in the timing diagram of FIG. 10.

While left side cell pixels of array 1033 subject to readout can have common exposure periods, readout of exposed left side cell pixels can be sequential. Similarly while right side cell pixels of array 1033 subject to readout can have common exposure periods, readout of exposed right side cell pixels can be sequential.

In the timing diagram of FIG. 10, readout of an image signal from charge storage area 6029 is depicted as being simultaneous with charge transfer as is indicated by the select transistor 6024 being on at the time of charge transfer. However, it will be understood that for other cells of an image sensor array 1033 readout may not be simultaneous with charge transfer. For another cell of image sensor array 1033, select transistor 6024 can be turned on at the period indicated by dashed in period 6042, 6044 for readout of a cell left bin and right bin respectively with all other timing being the same as depicted in the timing diagram of FIG. 10. During the delay between transfer of charge to charge storage area constructed in the manner charge storage area 6029 and the readout of a signal from the charge storage area 6029 a shield constructed in the manner of shield 6030 can be preventing light from being incident on the charge storage area thus reducing a buildup of charge on the charge storage area and maintaining the characteristic of a read out image signal as being representative of light incident on a bin of adjacent pixels during a preceding exposure period.

In the development of image sensor array 1033 it was determined that reading out binned pixel values representative of light over 1×N, N>=2 pixels can increase a likelihood of decoding a decodable indicia particularly where provided by a 1D bar code symbol having bars imaged in alignment to columns of the array 1033. A 1×N bin does not have any loss of pixel resolution in the x dimension, the critical dimension for one dimensional symbology (1D) decoding, and the lower resolution in the y dimension can increase a detection of a vertically elongated bar or space.

(e) 1×2 binning rolling reset configuration:

Operation in a 1×2 binning rolling reset configuration can be in the manner of a 1×2 global shutter interlacing configuration except that instead of cells subject to readout being subject to simultaneous exposure initiation and termination, and sequential readout, cells subject to readout can be subject to sequential exposure initiation, sequential exposure termination (by charge transfer) and sequential readout. While a 1×2 "bin" of pixels is specifically described, image sensor array 1033 can be configured so that bins can be provided in alternative dimensions, e.g., 1×N, N≥2 in accordance with a binning rolling reset configuration.

(f) 1×4 binning global shutter configuration:

With reference to the 1×2 binning global shutter interlacing configuration, it was described that pixels of an image sensor array 1033 can be exposed during successive global left cell pixel exposure periods and a right cell pixel exposure period, with cell left side pixels having a first common exposure period which can be regarded as a global exposure period and a cell right side pixels having a second common exposure period that can be regarded as a global exposure period.

With minor circuit modification, image sensor array 1033 can be provided in one embodiment so that all pixels of image sensor array 1033 subject to readout can have a common (global) exposure period with charges of pixels being aggregated to define binned pixel values indicative of light on a 1×4 pixel area.

Figure 11:
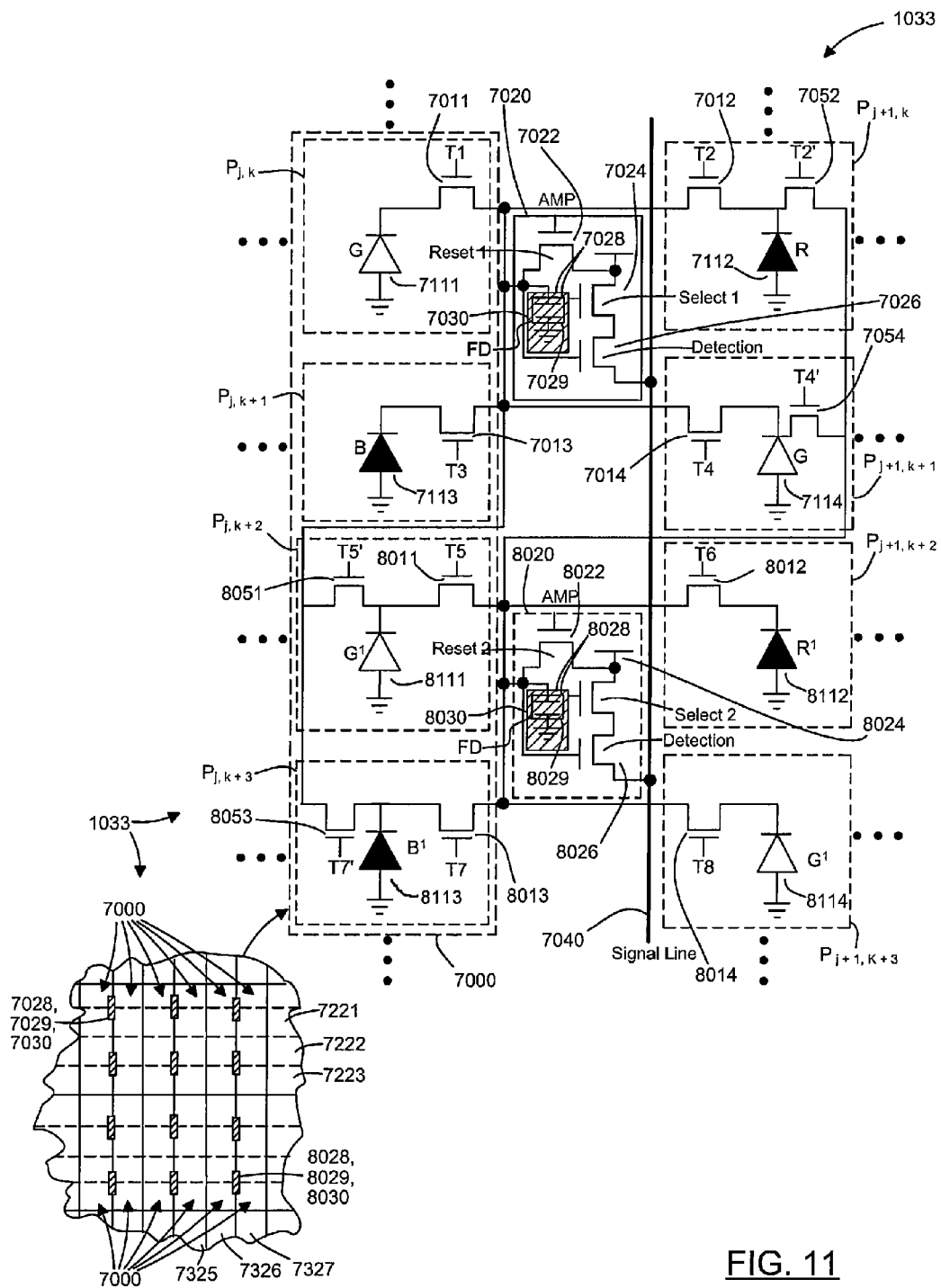
FIG. 11 is an electrical block diagram illustrating an embodiment of an image sensor array.

In the embodiment of FIG. 11, additional transfer transistors namely transistors 7052, 7054, 8051, 8053 are added for each four (2×2) pixel cell of array 1033 to provide 1×4 binning global shutter configuration as shown in FIG. 11. In the specific example of FIG. 11, there is provided a circuit arrangement yielding 1×4 binning. Depending on timing control, adjacent groups of pixels that share a common storage area 6029 can be a 2×2 group of pixels (by control according to configurations (a), (b), (c), (d), (e) or a 1×4 group of pixels (by control according to the control described herein below).

Accordingly, sets of pixels shown in FIG. 11 depending on timing control can define a 2×2 cell and a 1×4 cell. By deletion of transfer transistors, the circuit of FIG. 11 can be modified so that sharing of a global shutter 7028 having a charge storage area 7029 and opaque shield 7030 can be on a 1×4 basis but not a 2×2 basis so that the circuit defines a distribution of 1×4 pixel cells but not also a distribution of 2×2 pixel cells as in the embodiment of FIG. 11. While a 1×4 "bin" of pixels is specifically described, image sensor array 1033 can be configured so that bins can be provided in alternative dimensions, e.g., 1×N, N≥2 in accordance with a binning global shutter configuration, e.g. N=2, N=3, N=4, N=5, N=10 and so on. In one embodiment as shown in FIG. 11, 2×2 cell 6000 as described in connection with the transistor view section of FIG. 7 is defined by the set of pixels $P_{j,k}$, $P_{j+1,k}$, $P_{j,k+1}$, $P_{j+1,k+1}$, and also by the set of pixels $P_{j,k+2}$, $P_{j+1,k+2}$, $P_{j,k+1}$, $P_{j,k+3}$, $P_{j+1,k+3}$. A 1×4 cell of pixels is defined by set of pixels $P_{j,k}$, $P_{j,k+1}$, $P_{j,k+2}$, $P_{j,k+3}$ and also by the set of pixels $P_{j+1,k}$, $P_{j+1,k+1}$, $P_{j+1,k+2}$, $P_{j+1,k+3}$.

Referring to FIG. 11, there is shown a segment of an image sensor array 1033 having eight pixels, namely pixels $P_{j,k}$, $P_{j+1,k}$, $P_{j,k+1}$, $P_{j+1,k+1}$, and pixels $P_{j,k+2}$, $P_{j+1,k+2}$, $P_{j,k+1}$, $P_{j,k+3}$, $P_{j+1,k+3}$. The pixels define rows and columns of pixels that can extend through the active area of image sensor array 1033. The segment of FIG. 11 includes a global shutter 7028 having charge storage area 7029 and global shutter 8028 having a charge storage area 8029, each of global shutter 7028 and global shutter 8028 having an associated opaque shield 7030, 8030 for reducing a charge build up on storage areas 7029, 8029, respectively attributable to light rays being incident of array 1033. Charge storage area 7029 can be provided as part of an amplifier circuit 7020 which includes charge storage area 7029 provided by a floating diffusion, reset transistor 7022, select transistor 7024 and detection transistor 7026. Charge storage area 8029 can be provided as part of an amplifier circuit 8020 which includes charge storage area 8029 provided by a floating diffusion, reset transistor 8022, select transistor 8024, and detection transistor 8026.

Figure 12:
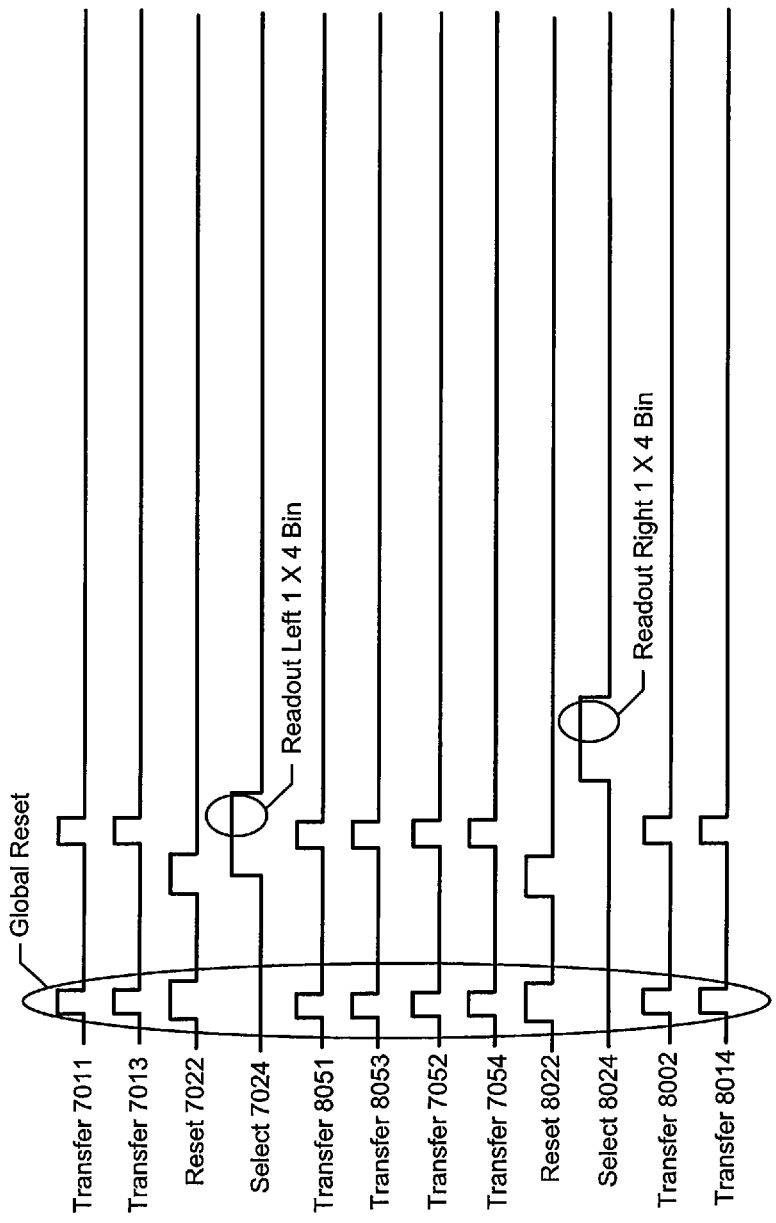
FIG. 12 is a timing diagram illustrating operation of an apparatus according to a 1×4 binning global shutter configuration.

Timing and control circuit 1038 can generate the timing control as shown in FIG. 12 to provide operation in a 1×4 binning global shutter configuration.

Referring to the timing diagram of FIG. 12, each pixel shown in FIG. 11 can be subject to simultaneous exposure initiation by turning on and off of the indicated transfer and reset transistors in the manner indicated. Each pixel shown in FIG. 11 can be subject to simultaneous exposure termination and charge transfer by turning on and off the indicated transfer transistors. The turning on and off of the indicated transfer transistors can be subsequent to a turning on and off of the indicated reset transistors to clear accumulated charges therefrom, the presence of shields 7030, 8030 reducing such charges.

For simultaneous exposure termination and charge transfer referring to the timing diagram of FIG. 12 the turning on and off of transfer and reset transistors can be coordinated so that charges from left side pixel photodiodes are transferred to charge storage area 7029 and further so that charges from right side pixel photodiodes are transferred to charge storage area 8029. The transfer of charges of left side photodiodes 7111, 7113, 8111, 8113 to charge storage area 7029 being simultaneous, the charges will be aggregated to define a binned pixel value indicative of light incident on the spatial area delimited by the set of pixels $P_{j,k}$, $P_{j,k+1}$, $P_{j,k+2}$, $P_{j,k+3}$. The transfer of charges of right side photodiodes 7012, 7014, 8012, 8014 to charge storage area 8029 being simultaneous the charges will be aggregated to define a binned pixel value indicative of light incident on the spatial area delimited by the set of pixels $P_{j+1, k}$, $P_{j+1, k+1}$, $P_{j+1, k+2}$, $P_{j+1, k+3}$. Further referring to the timing diagram of FIG. 12 readout of signals from charge storage area 7029 and charge storage area 8029 can be sequential. Namely, select transistor 7024 can be turned on and off to read out a signal corresponding to the binned pixel value charge stored at charge storage area 7029 and then select transistor 8024 can be subsequently turned on and off to read out a signal corresponding to the binned pixel value charge stored at charge storage area 8029. During the delay between the readouts of signals from charge storage area 7029 and charge storage area 8029, opaque shield 8030 can be blocking light rays from being incident of charge storage area 8029 thereby reducing unwanted charge buildup on charge storage area 8029.

Exposure transfer and readout can be performed over a larger area of the array 1033 in the manner depicted for the set of pixels shown in FIG. 11 with reference to the timing diagram of FIG. 12. In a 1×4 binning global shutter configuration each cell (and each pixel of each cell) subject to readout can be subject to simultaneous exposure initiation and termination so that each pixel of image sensor array 1033 subject to readout has a common exposure period that can be regarded as a global exposure period. Readout of exposed pixels can be sequential however. In the timing diagram of FIG. 12 readout of image signal from charge storage area 7029 is depicted as being simultaneous with charge transfer as is indicated by the select transistor being on at the time of charge transfer. However, it will be understood that for other charge storage areas of an image sensor array 1033 readout may not be simultaneous with charge transfer. For example readout of pixel value in the form of an analog signal from charge storage area 8029 is not simultaneous with charge transfer. During the delay between transfer of charge to charge storage area constructed in the manner charge storage area 8029 and the readout of a signal from the charge storage area 8029 shield 8030 can be preventing light from being incident on the charge storage area 8029 thus reducing a buildup of charge on the charge storage area 8029. Referring to exploded view section of FIG. 11, 1×4 cells constructed according to cell 7000 can be distributed throughout array 1033 to define aligned and adjacent rows and columns of 1×4 cells 7000 or image sensor array 1033, the aligned adjacent 1×4 cells 7000 defining rows e.g., rows 7221, 7222, 7223 and columns e.g., columns 7325, 7326, 7327 of pixels.

All the above configurations (a) through (f) can be performed with windowing operation so that there can be provided binning with windowing with a single frame readout. Windowing can be accomplished by selectively addressing for readout of binned or unbinned pixel values from less than a maximum number of pixels at one or more localized pixel coordinate areas of image sensor array 1033. An example of a window is a center J (J≥1) rows of pixels of image sensor array 1033, where J is the number of rows of image sensor array 1033.

In one embodiment, configurations as set forth herein are "fixed" configurations. That is, apparatus 1000 can be manufactured and provided to an end user so that the function of the apparatus 1000 does not vary from the function of a particular configuration e.g., one of configurations (a) (b) (c) (d) (e) or (f) in the lifetime of the apparatus 1000.

In another embodiment, the configurations set forth herein are dynamic configurations capable of change during the lifetime of the apparatus 1000 responsively to an operator input control. Image sensor 1032 can have appropriate switching circuitry 1031 as indicated in FIG. 2 for performing the noted switching functionality and image sensor array 1033 can be configured so that each of the configurations (a) (b) (c) (d) (e) and (f) can be activated by apparatus 1000. In one example, a user interface display 1222 can display various buttons 6102, 6104, 6106, 6108, 6110, 6112 as shown in FIG. 1 corresponding to various configurations allowing an operator to actuate one configuration out of a plurality of configurations. Apparatus 1000 can also be adapted so that an operator can input an alternative operator input control for selection of a configuration. The alternative operator input control can be e.g., one or more of a serial command transmitted from a computer external to apparatus 1000 and received by communication interface 1050 of apparatus 1000 or a reading of a programming bar code symbol. The configurations (a), (b), (c), (d), (e), and (f) set forth herein are set forth as being configurations of imaging apparatus 1000. As specific operations of image sensor array 1033 correspond to each configuration, the configurations (a), (b), (c), (d), (e), and (f) can be regarded as configurations of image sensor array 1033, image sensor 1032 and image sensor integrated circuit 1040. In one embodiment, apparatus 1000 can be operative so that apparatus 1000 remains in a currently active configuration for a duration of a trigger signal activation period (the on time of trigger signal 5002) as set forth with reference to the timing diagram of FIG. 6.

Apparatus 1000 can also be adapted to capture one or more frame between trigger signal activation periods, and can process the one or more frame for sensing of one or more sensed condition.

In one embodiment an operator can activate a certain one of a plurality of configurations in a manner that is dependent on an expected operating environment of apparatus 1000. Document reading is a process where a standard sized document, e.g., A4 paper, business card, is subject to image capture for archiving purposes. In the development of apparatus 1000, it was determined that for document reading frame pixel resolution is often an important factor in determining a quality of a frame representing a standard size document. Standard size documents commonly include fine grain print or other details not rendered appropriately absent highest pixel resolution. Accordingly, in the development of apparatus 1000 it was determined that it can be useful for an operator to input an operator input control to activate configuration (a) rolling reset configuration, yielding a highest possible pixel resolution for use of apparatus 1000 in performance of document reading.

In the development of apparatus 1000 it was determined that motion tolerance is an important factor in determining success and speed of decoding for decodable indicia. Configurations set forth herein such as configurations (b) (d) and (f) that facilitates global shutter operation can provide improved motion tolerance and accordingly improved decoding success rate and speed. Configurations herein facilitating global shutter operation facilitate improved motion tolerance for the reason that with shorter exposure times resulting from global shutter operation, movement of apparatus 1000 or target T (FIG. 2) during exposure is less likely to result in image blur of a captured frame. Accordingly, in use of apparatus 1000, an operator can input an operator input control to activate a configuration facilitating global shutter operation for use of the apparatus for indicia decoding.

By the providing of both a rolling reset configuration and a configuration in which global shutter operation is facilitated there is set forth herein in one embodiment an imaging apparatus comprising an image sensor array, an imaging lens assembly for focusing an image onto the image sensor array wherein the imaging apparatus includes a first configuration in which one or more frame is read out of the image sensor array in accordance with a rolling shutter operation in which exposure of pixels of first and second rows of pixels of the image sensor array is initiated sequentially, and wherein pixel values responsive to light incident on pixels of the first and second rows of pixels subject to readout are un-binned pixel values that represent light incident on a spatial area delimited by a single pixel of the image sensor array, and wherein the imaging apparatus includes a second configuration in which one or more frame is read out of the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values read out using shared global shutter circuitry of the image sensor array that represent light incident on a spatial area delimited by an arrangement of two or more pixels of the image sensor array.

Further, in the development of apparatus 1000 it was determined that different configurations that facilitate global shutter operation can yield a most significant improvement in decoding performance depending on a particular reading range (imaging apparatus to target distance). In the development of apparatus 1000 it was determined that at relatively close reading range (imaging apparatus to target distance), e.g., under 30 cm, a reduction of pixel resolution of a captured frame from a full pixel resolution (one pixel value for each pixel subject to readout) is less likely to affect decoding performance. At relatively close reading range, a decodable indicia representation is more likely to be represented by pixel values of a larger portion of the frame. Accordingly, in the development of apparatus 1000 it was determined that an operator can input and operator input control to apparatus 1000 for activation of configuration facilitating global shutter operation with binned pixel values representing light incident on an area M×N bin of pixels, M>=2, N>=2, e.g., configuration (b) for use of the apparatus 1000 for decoding at relatively close reading range, providing good motion tolerance and pixel resolution sufficient for facilitating decoding of 1D and 2D (e.g., matrix bar code symbols) at relatively close reading range.

Further in the development of apparatus 1000 it was determined that at relatively longer reading ranges, e.g., greater than 5 m, a decodable indicia is likely to be represented by a smaller portion of pixel values of a frame and accordingly more likely to be affected by a loss in resolution. Accordingly, in the development of apparatus 1000 it was determined that an operator can input an operator input control to apparatus 1000 for activation of configuration facilitating global shutter operation with binned pixel values representing light incident on an area 1×N bin of pixels, N>=2 for use of the apparatus 1000 for decoding at longer reading ranges. With 1×N binning active a read out and captured frame includes full pixel resolution in the x dimension, reduced pixel resolution in the y dimension. A 1×N bin does not have any loss of pixel resolution in the x dimension, the critical dimension for 1D decoding, and the lower resolution in the y dimension can increase a detection of a vertically elongated bar or space. Accordingly, activation of a configuration facilitating global shutter operation and 1×N binning can increase motion tolerance without reduction of pixel resolution in the x dimension and without reduction of decoding performance.

In another embodiment, image sensor array 1033 can be controlled so that configurations described herein are dynamic configurations that can be varied responsively a sensed condition.

Figure 13:
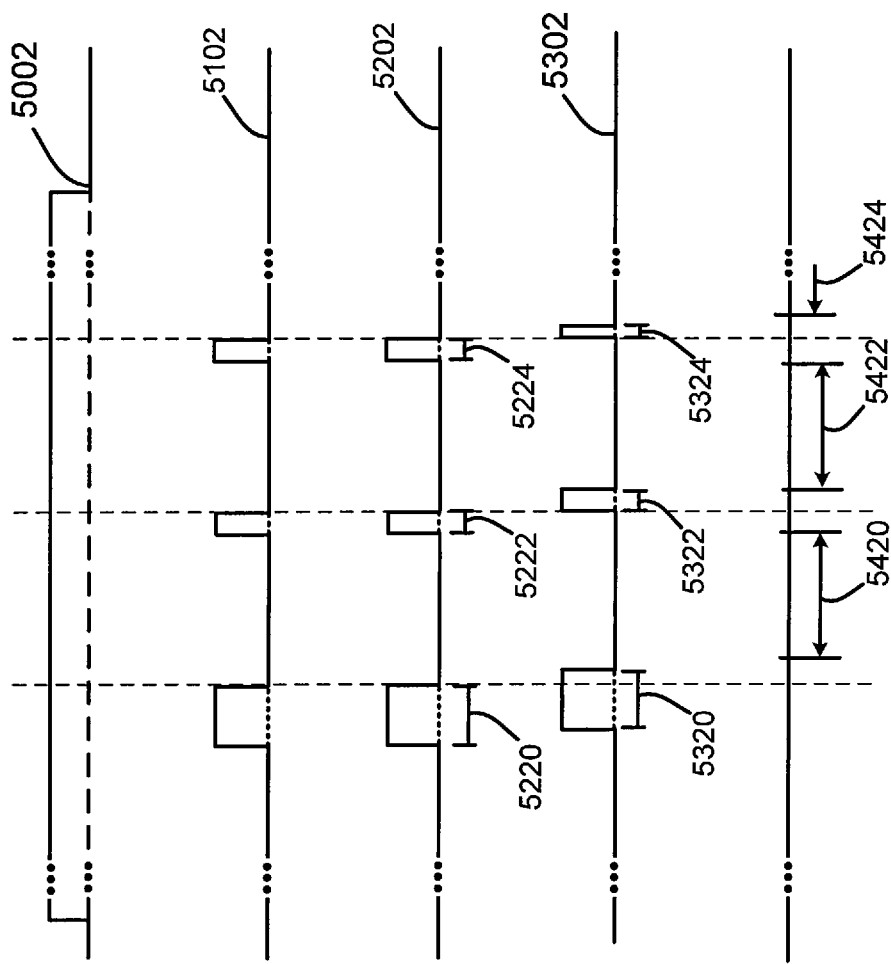
FIG. 13 is a timing diagram illustrating a method that can be performed by an imaging apparatus.

A timing diagram illustrating operation of apparatus 1000 in one embodiment during performance of image capture operations is shown in FIG. 13. Referring to the timing diagram of FIG. 13, signal 5002 is a trigger signal which can be made active, e.g., via actuation of trigger 1220, via power up apparatus 1000, via receipt of a serial command from an external computer. Signal 5102 is an illumination energization level signal having on and off states. Signal 5202 is an exposure control signal having active states defining exposure periods and inactive states intermediate exposure periods. Exposure control signal 5202 can control activation and deactivation of transfer transistors, e.g., transfer transistor 6011 and reset transistors e.g., reset transistor 6022. Signal 5302 is a readout control signal. When readout control signal 5302 is active, image signals can be read out of image sensor array 1033. Further regarding the timing diagram of FIG. 13, periods 5420, 5422, 5424 are periods at which CPU 1060 can process frames of image data, e.g., for one or more of attempting to decode for decodable indicia, de-mosaicing in the case the image data is color image data, parameter determination. Period 5220 is the exposure period for frame$_{N-1}$, period 5320 is the readout period for frame$_{N-1}$ and period 5420 is the processing period for frame$_{N-1}$. For the succeeding frame, frame$_N$, periods 5222, 5322, 5422 are the exposure, readout and processing periods respectively. For the next succeeding frame, frame$_{N+1}$, periods 5224, 5324, 5424 are exposure, readout and processing periods respectively. Apparatus 1000 can be operative so that prior to exposure period 5220 and after trigger signal 5002 is activated apparatus 1000 can be capturing "parameter determination" frames that are processed for parameter (e.g., exposure, gain) determination and in some instances, not subject to a decode attempt or other processing unrelated to parameter determination.

With reference to the timing diagram of FIG. 13 Frame=Frame$_{N-1}$ can be read out in according with the rolling reset configuration and can have a full frame full pixel resolution with a frame picture size equal to the picture size of the image sensor array 1033. In one example image sensor array 1033 can be a 5 Mpx (2592×1944) image sensor array and Frame=Frame$_{N-1}$ can have a picture size of 2592×1944 pixel values.

With further reference to the timing diagram of FIG. 13 Frame=Frame$_{N-1}$ can be read out with image sensor array 1033 operating in accordance with a 2×2 binning global shutter configuration and can read out a full frame of reduced pixel resolution having a picture size of 1296×972 (quarter pixel resolution resulting from 2×2 binning).

Frame=Frame$_{N+1}$ can be read out with image sensor array 1033 operating in accordance with a 1×N (N=4) binning global shutter configuration, configuration (f) with windowing and can output a windowed frame of reduced pixel resolution. In one example a window of 2592×500 center row pixels can be exposed for read out of a reduced pixel resolution windowed frame having picture size (number of pixel values) of 2592×125 (full pixel resolution in the x dimension, reduced pixel resolution in the y dimension).

Frame=Frame$_{N-1}$ having the highest resolution of Frames=Frame$_{N-1}$, Frame$_N$, Frame$_{N+1}$ can be a frame optimized for visual quality and can be particularly well suited for use as a digital photograph for display on a display e.g., display 1222 or for archiving. Frames for use a digital photograph can include portrait type frames (personal portrait, landscape) and document reading frames, e.g., where apparatus 1000 is used for document reading and archiving and/or displaying a standard size document, e.g., and A4 paper document or a business card document. Frames=Frame$_N$, Frame$_{N+1}$ as indicated in the timing diagram of FIG. 13 have relatively short exposure periods and accordingly have improved motion tolerance and each can be particularly well suited for use as a frame for subjecting to attempts to decode for a decodable indicia during respective processing period 5422, 5424 (Frame=Frame$_{N-1}$ can also be subject to an attempt to decode during processing period 5420). Frame=Frame$_N$ being a full frame of reduced pixel resolution relative to a full pixel resolution frame can be especially well suited for reading at a close imaging apparatus to target distance where a decodable indicia such as a bar code symbol representation can be expected to consume a relatively larger area of a target substrate T (FIG. 2) that can be represented by a full frame and where spatial resolution can be less important for providing a successful decode. Frame=Frame$_{N+1}$ being a windowed frame of reduced resolution (but with no reduction in pixel resolution in the x dimension) can be especially well suited for use in a decode attempt at a relatively longer imaging apparatus to target distance where a decodable indicia can be expected to consume a relatively smaller portion of an area that can be represented by a full frame of image data and where spatial resolution of a frame is relatively more important for a successful decode.

In one embodiment the switching of configurations as indicated in the timing diagram of FIG. 13 during a trigger signal activation period can be on a closed loop basis e.g., responsive to one or more sensed condition. In one embodiment a sensed condition can be a sensed imaging apparatus to target distance. A sensed imaging apparatus to target distance can be determined e.g., based on an output of one or more of range detection unit 1210 or based on a position and/or size of a projected light pattern such as aiming pattern 1262 (FIG. 2) in a captured frame of image data (in such embodiment, projection of aiming pattern 1262 can be synchronized to one or more exposure period occurring during a trigger signal activation period). For example, apparatus 1000 can be operative to switch to a 2×2 binning global shutter configuration, configuration (b) on sensing of a close imaging apparatus to target distance (d=d$_1$) and can further be operative to switch to a 1×4 binning global shutter configuration, configuration (f), on sensing of a long range imaging apparatus to target distance d=d$_2$>d$_1$, and can further be operative to switch to a rolling reset configuration, configuration (a), on sensing of a maximally long imaging apparatus to target distance d=d$_3$>d$_2$. A sensing that a maximally long reading distance, d=d$_3$, is present can be a determination that apparatus 1000 is being used to capture a portrait frame of image data in which activation of a rolling reset configuration having full pixel resolution can optimize apparatus 1000 for performance of the use case. In one example, d$_1$ can be designated as distances of under 1 m, d$_2$ can be designated as distances between 1 m and 30 m and d$_3$ can be designated as distances of greater than 30 m. In one embodiment, one or more sensed condition can be determined by processing of image data e.g., image data captured using imaging assembly 1033 of imaging apparatus 1000. In one example as already referenced, the processing can be processing to determine a location and/or size of a projected light pattern projected by the apparatus 1000 for purposes of determining a reading range (imaging apparatus to target distance). In another example a processing of image data can be processing to determine that a decodable indicia is represented in a captured frame of image data. For example, apparatus 1000 can be operating in rolling reset configuration, configuration (a) and a processing of a frame captured using image sensor array 1033 with the configuration active e.g., during processing period 5420 can yield a determination that a decodable indicia is represented in a current field of view of apparatus 1000. Apparatus 1000 can be operative so that responsively to such determination apparatus 1000 can switch operation of apparatus 1000 to a configuration that well adapts apparatus 1000 for use in decoding of decodable indicia, e.g., a configuration facilitating global shutter operation, e.g., configurations (b), (d), or (f) set forth herein. While in some embodiments, it can be useful to activate configuration (a) for digital photograph reading, configuration (b) for relatively close range indicia decoding, and configuration (f) for relatively long range indicia decoding, it will be understand that the various configurations can be usefully activated for alternative applications. For example, it can be useful to activate configurations (b) or (f) for digital photograph capture where motion tolerance is a major concern, or activate configuration (b) for relatively long range indicia decoding, or activate configuration (a) for indicia decoding at relatively close or relatively long range or activate configuration (f) for digital photograph capture or for relatively close range indicia decoding.

While an example is set forth with reference to FIG. 13 wherein configurations can be switched responsively to one or more sensed condition sensed during a trigger signal activation period, a switching of configurations responsively to a sensed condition can in addition or alternatively occur intermediate of trigger signal activation periods. For example, between trigger signal activation periods apparatus 1000 can be operative to determine a range of apparatus 1000 or other sensed condition and responsively to the range determination or other sensed condition can activate a certain configuration and in one embodiment apparatus 1000 can operate in accordance with the certain configuration for a duration of a next activated trigger signal activation period. In one embodiment, imaging apparatus 1000 can be operative so that intermediate of trigger signal activation periods, imaging apparatus 1000 utilizes image sensor array 1033 to capture one or more frame of image data for processing for determining a sensed condition, as set forth herein.

Further, in one embodiment with reference to the timing diagram of FIG. 13 configurations of image sensor array 1033 can be switched responsively to a trigger signal activation on an open loop basis without being responsive to a sensed condition. In the example of the timing diagram of FIG. 13 a configuration switching is depicted wherein there is switching between configuration (a), configuration (b) and configuration (f). However, apparatus 1000 can be operative to perform configuration switching according to an alternative pattern, e.g., any possible permutation of an ordering of the configurations (a), (b) and (f). Further, apparatus 1000 can be operative so that a period of an activated configuration is more than one frame. In the example of FIG. 13, the configuration activation periods are depicted as having a duration of one frame. However, apparatus 1000 can be adapted in another embodiment so that one or more configurations depicted as being activated during a trigger signal activation period have configuration activation periods of more than one frame.

A small sample of systems methods and apparatus that are described herein is as follows:

A1. An apparatus comprising:
an image sensor array having a plurality of pixels including a first pixel and a second pixel, the first pixel and the second pixel sharing a common global shutter having a charge storage area and an associated opaque shield, the opaque shield for reducing charge buildup on the charge storage area attributable to light rays being incident on the charge storage area.

A2. The apparatus of A1, wherein the image sensor array is operative so that a charge from the first pixel is transferred to the charge storage area and remains at the charge storage area for a storage period prior to readout of the charge from the charge storage area, wherein the opaque shield reduces build up of charge at the charge storage area during the charge storage period so that an affect of incident light on the charge storage area during the charge storage period is reduced.

A3. The apparatus of A2, wherein the image sensor array is operative so that a charge from the second pixel is transferred to the common charge storage area simultaneously with the transfer of the charge from the first pixel, the charge storage area storing an aggregate charge of at least the first pixel and the second pixel.

A4. The apparatus of A3, wherein the image sensor array includes the first pixel, the second pixel, a third pixel and a fourth pixel shared by the charge storage area, wherein the image sensor array is operative so that charge from the second pixel, third pixel and fourth pixel are transferred to the charge storage area simultaneously with the transfer of charge from the first pixels, wherein the charge storage area has an aggregate charge of the first pixel, second pixel, third pixel and fourth pixel defining a binned pixel value present light over the spatial area defined by the first pixel, second pixel, third pixel and fourth pixel.

A5. The apparatus of any of A1 through A4, wherein the image sensor array is operative so that charges from the first pixel and the second pixel are subject to simultaneous transfer to the charge storage area for storage of an aggregate charge on the charge storage area for a storage period prior to readout of the aggregate charge from the charge storage area, wherein the aggregate charge defines a binned pixel value, and wherein the opaque shield reduces build up of charge at the charge storage area attributable to incident light rays during the charge storage period so that an affect of incident light on the charge storage area during the charge storage period is reduced.

A6. The apparatus of A5, wherein the binned pixel value represents light incident on a spatial area delimited by a 1×N, N≥2 arrangement of adjacent pixels of the image sensor array.

A7. The apparatus of A5, wherein the binned pixel value represents light incident on a spatial area delimited on an M×N, M≥2, N≥2 arrangement of adjacent pixels of the image sensor array.

A8. The apparatus of any of A1 through A7, wherein the apparatus includes a hand held housing in which the image sensor array is disposed.

A9. The apparatus of any of A1 through A7, wherein the apparatus is provided by an image sensor integrated circuit.

A10. The apparatus of any of A1 through A8, wherein the apparatus is provided by an imaging apparatus having an imaging lens for focusing an image onto the image sensor array, the apparatus operative to capture a frame of image data utilizing the image sensor array.

A11. The apparatus of any of A1 through A8, wherein the apparatus is provided by an imaging apparatus having an imaging lens for focusing an image onto the image sensor array, the imaging apparatus being operative to capture a frame of image data utilizing the image sensor array and further being operative to subject the frame of image data to an attempt to decode a decodable indicia.

A12. The apparatus of A10 or A11, wherein the frame of image data is a windowed frame.

A13. The apparatus of A10 or A11 wherein the frame of image data is a windowed frame having binned pixel values.

A14. The apparatus of A10 or A11, wherein the frame of image data is a windowed frame having binned pixel values, wherein pixel values of the binned pixel values represent light incident on a spatial area delimited by a 1×N, N≥2 arrangement of adjacent pixels of the image sensor array.

A15. The apparatus of A10 or A11, wherein the apparatus is operative so that responsively to trigger signal activation the apparatus reads out a first frame and a second frame of image data from the image sensor array.

A16. The apparatus of A15, wherein the second frame of image data is read out subsequent to read out of the first frame.

A17. The apparatus of A15, wherein the first frame is a full pixel resolution full frame and wherein the second frame of image data has a picture size reduced relative to a picture size corresponding to a full pixel resolution full frame.

A18. The apparatus of A15, wherein the first frame has a first set of pixel values corresponding to a first set of pixels of the image sensor array, wherein the second frame has a set of pixel values corresponding to a second set of pixels of the image sensor array, the second set of pixels being different than the first set.

A19. The apparatus of A15, wherein the first frame has a first set of pixel values corresponding to a first set of pixels of the image sensor array, wherein the second frame has a set of pixel values corresponding to a second set of pixels of the image sensor array, the second set of pixels being different than the first set, wherein one or more of the first set of pixel values and second set of pixel values are binned pixel values.

A20. The apparatus of any of A1 through A19, wherein the first pixel and the second pixel are disposed in first and second adjacent rows of the image sensor array, wherein the image sensor array is operative so that the first pixel and the second pixel have sequential exposure initiation times, wherein the image sensor array is further operative so that the first pixel and the second pixel have sequential readout times.

A21. The apparatus of any of A1 through A20, wherein the apparatus includes a first configuration and a second configuration, wherein each of the first configuration and the second configuration are configurations in which pixels of different rows of the image sensor array subject to readout have common exposure initiation and termination times.

A22. The apparatus of any of A1 through A20, wherein the apparatus includes a first configuration and a second configuration, wherein each of the first configuration and the second configuration are configurations in which pixels of the image sensor array subject to readout have common exposure initiation and termination times, wherein binned pixels values corresponding to arrangements of adjacent pixels of a first dimension are read out of the image sensor array when the apparatus operates in accordance with the first configuration, and wherein binned pixel values corresponding to arrangements of adjacent pixels of a second dimension are read out of the image sensor array when the apparatus operates in accordance with the second configuration, and wherein the second dimension is different than the first dimension.

A23. The apparatus of any of A1 through A20, wherein the apparatus includes a first configuration and a second configuration, wherein the first pixel and the second pixel of the image sensor array when subject to readout with the first configuration active do not have common exposure initiation and termination times, and wherein the first pixel and second pixel of the image sensor array when subject to readout with the second configuration active do have common exposure initiation and termination times.

A24. The apparatus of any of A1 through A20, wherein the apparatus includes a first configuration and a second configuration, wherein apparatus is operative to switch from the first configuration to the second configuration responsively to a manually input control manually input to the apparatus, the apparatus operating in accordance with a selected configuration for a duration of a trigger signal activation period activated subsequent to a selection of a selected configuration.

A25. The apparatus of any of A1 through A20, wherein the apparatus has a first configuration in which pixel values read out from the image sensor array are devoid of binned pixel values corresponding to bins of pixels of the image sensor array, and a second configuration in which pixel values read out from the image sensor array include binned pixel values corresponding to bins of pixels, wherein the apparatus is operative to switch between the first configuration and the second configuration responsively to one or more of a sensed condition and an operator input control.

A26. The apparatus of any of A1 through A25, wherein the image sensor array includes a plurality of cells, each cell having a set of components constructed in accordance with the first pixel the second pixel the common storage area and the shield so that each cell has a first pixel a second pixel a common storage area and an opaque shield.

A27. The apparatus of any of A1 through A25, wherein the image sensor array includes first and second cells, each cell of the first and second cells having a set of components constructed in accordance with the first pixel the second pixel, the common storage area and the shield so that each of the first cell and the second cell has a first pixel a second pixel a common storage area and an opaque shield, wherein the image sensor array is operative so that there is a common exposure initiation time for exposure of the first and second pixels of the first cell and for the first and second pixels of the second cell, the image sensor array further being operative so that transfer of charge from the first pixel to the charge storage area of the first cell and transfer of charge from the first pixel to the charge storage area of the second cell is performed simultaneously, the image sensor array further being operative so that readout of charge from the charge storage area of second cell is initiated sequentially in relation to readout of charge from the charge storage area of the first cell.

A28. The apparatus of any of A1 through A26, wherein the charge storage area is included in a pixel amplifier circuit.

A29. The apparatus of any of A1 through A27, wherein the apparatus is operative in accordance with a configuration wherein exposure of pixels of successive rows of cells of the image sensor array is initiated sequentially.

A30. The apparatus of any of A1 through A27, wherein the apparatus is operative in accordance with a configuration, wherein exposure of pixels of a plurality of rows of pixels the image sensor array is initiated simultaneously.

A31. The apparatus of any of A1 through A27, wherein the apparatus is operative in accordance with a configuration, wherein exposure of pixels of a plurality of rows of cells of the image sensor array is initiated simultaneously, and wherein there is read out from the image sensor array pixel values corresponding to bins of pixels having vertically elongated dimensions M×N, N>M.

B1. An apparatus comprising:
an image sensor array having a first arrangement of adjacent pixels including a first pixel and a second pixel, the first pixel and the second pixel of the first arrangement of adjacent pixels sharing a first global shutter having a first charge storage area;
wherein the image sensor array has a second arrangement of adjacent pixels including a first pixel and a second pixel, the first pixel and the second pixel of the second arrangement of adjacent pixels sharing a second global shutter having a second charge storage area;
wherein the first pixel and the second pixel of the first arrangement of adjacent pixels are disposed in first and second rows of the image sensor array respectively, and wherein the first pixel and the second pixel of the second arrangement of adjacent pixels are disposed in third and fourth rows of the image sensor array respectively;
wherein the image sensor array is operative so that each of the first pixel and the second pixel of the first arrangement of adjacent pixels and each of the first pixel and the second pixel of the second arrangement of adjacent pixels have common exposure initiation and termination times;
wherein the image sensor array is further operative so that readout of an image signal corresponding to a charge stored on the second common charge storage area is performed sequentially relative to readout of an image signal corresponding to a charge stored on the first common charge storage area.

B2. The apparatus of B1, wherein the second common charge storage area comprises an associated opaque shield, the opaque shield for reducing an amount of charge build up on the second common charge storage area attributable to light rays being incident on the second common charge storage area during a delay between a termination of exposure of the first pixel and the second pixel of the second arrangement of adjacent pixels, and read out of an image signal corresponding to a charge stored on the second common charge storage area.

B3. The apparatus of B2, wherein the image sensor array is operative so that a charge from the first pixel of the second arrangement of adjacent pixels is transferred to the common charge storage area of the second arrangement of adjacent pixels and remains at the common charge storage area of the second arrangement of adjacent pixels for a storage period prior to readout of the charge from the common charge storage area of the second arrangement of adjacent pixels, wherein the opaque shield reduces build up of charge at the common charge storage area of the second arrangement of adjacent pixels during the charge storage period so that an affect of incident light on the common charge storage area during the charge storage period is reduced.

B4. The apparatus of any of B1 through B3, wherein the image sensor array is operative so that a charge from the second pixel of the second arrangement of adjacent pixels is transferred to the common charge storage area of the second arrangement of adjacent pixels simultaneously with the transfer of the charge from the first pixel of the second arrangement of adjacent pixels, the common charge storage area of the second arrangement of adjacent pixels storing an aggregate charge of at least the first pixel and the second pixel.

B5. The apparatus of B4, wherein the second arrangement of adjacent pixels includes the first pixel, the second pixel, a third pixel and a fourth pixel shared by the common charge storage area of the second arrangement of adjacent pixels, wherein the image sensor array is operative so that charge from the second pixel, third pixel and fourth pixel of the second arrangement of adjacent pixels are transferred simultaneously with the transfer of charge from the first pixel of the second arrangement of adjacent pixels, wherein the common charge storage area of the second arrangement of adjacent pixels stores an aggregate charge of the first pixel, second pixel, third pixel and fourth pixel defining a binned pixel value representing light over the spatial area defined by the first pixel, second pixel, third pixel and fourth pixel of the second arrangement of adjacent pixels.

B6. The apparatus of any of B1 through B4, wherein the image sensor array is operative so that charges from the first pixel and the second pixel of the second arrangement of adjacent pixels are subject to simultaneous transfer to the common charge storage area of the second arrangement of adjacent pixels for storage of an aggregate charge on the common charge storage area of the second arrangement of adjacent pixels for a storage period prior to readout of the aggregate charge from the common charge storage area of the second arrangement of adjacent pixels, wherein the aggregate charge defines a binned pixel value, and wherein the opaque shield reduces build up of charge at the common charge storage area attributable to incident light rays during the charge storage period so that an affect of incident light on the common charge storage area during the charge storage period is reduced.

B7. The apparatus of B6, wherein the binned pixel value represents light incident on a spatial area delimited by a 1×N, N≥2 arrangement of adjacent pixels of the image sensor array.

B8. The apparatus of B6, wherein the binned pixel value represents light incident on a spatial area delimited on an M×N, M≥2, N≥2 arrangement of adjacent pixels of the image sensor array.

B9. The apparatus of any of B1 through B8, wherein the apparatus includes a hand held housing in which the image sensor array is disposed.

B10. The apparatus of any of B1 through B9, wherein the apparatus is provided by an image sensor integrated circuit.

B11. The apparatus of any of B1 through B9, wherein the apparatus is provided by an imaging apparatus having an imaging lens for focusing an image onto the image sensor array, the apparatus operative to capture a frame of image data utilizing the image sensor array.

B12. The apparatus of any of B1 through B9, wherein the apparatus is provided by an imaging apparatus having an imaging lens for focusing an image onto the image sensor array, the imaging apparatus being operative to capture a frame of image data utilizing the image sensor array and further being operative to subject the frame of image data to an attempt to decode a decodable indicia.

B13. The apparatus of B11 or B12, wherein the frame of image data is a windowed frame.

B14. The apparatus of B11 or B12, wherein the frame of image data is a windowed frame having binned pixel values.

B15. The apparatus of B11 or B12, wherein the frame of image data is a windowed frame having binned pixel values, wherein pixel values of the binned pixel values represent light incident on a spatial area delimited by a 1×N, N≥2 arrangement of adjacent pixels of the image sensor array.

B16. The apparatus of any of B11 or B12, wherein the apparatus is operative so that responsively to trigger signal activation the apparatus reads out a first frame and a second frame of image data from the image sensor array.

B17. The apparatus of B16, wherein the second frame of image data is read out subsequent to read out of the first frame.

B18. The apparatus of B16, wherein the first frame is a full pixel resolution full frame and wherein the second frame of image data has a picture size reduced relative to a picture size corresponding to a full pixel resolution full frame.

B19. The apparatus of B16, wherein the first frame has a first set of pixel values corresponding to a first set of pixels of the image sensor array, wherein the second frame has a set of pixel values corresponding to a second set of pixels of the image sensor array, the second set of pixels being different than the first set.

B20. The apparatus of B16, wherein the first frame has a first set of pixel values corresponding to a first set of pixels of the image sensor array, wherein the second frame has a set of pixel values corresponding to a second set of pixels of the image sensor array, the second set of pixels being different than the first set, wherein one or more of the first set of pixel values and second set of pixel values are binned pixel values.

B21. The apparatus of any of B1 through B20, wherein the apparatus includes a first configuration and a second configuration, wherein each of the first configuration and the second configurations are configurations in which pixels of different rows of the image sensor array subject to readout have common exposure initiation and termination times.

B22. The apparatus of any of B1 through B20, wherein the apparatus includes a first configuration and a second configuration, wherein each of the first configuration and the second configuration are configurations in which pixels of the image sensor array subject to readout have common exposure initiation and termination times, wherein binned pixels values corresponding to pixel sets of a first dimension are read out of the image sensor array when the apparatus operates in accordance with the first configuration, and wherein binned pixel values corresponding to pixel sets of a second dimension are read out of the image sensor array when the apparatus operates in accordance with the second configuration, and wherein the second dimension is different than the first dimension.

B23. The apparatus of any of B1 through B20, wherein the apparatus includes a first configuration and a second configuration, wherein apparatus is operative to switch from the first configuration to the second configuration responsively to a manually input control manually input to the apparatus, the apparatus operating in accordance with a selected configuration for a duration of a trigger signal activation period activated subsequent to a selection of a selected configuration.

B24. The apparatus of any of B1 through B23, wherein the common charge storage area of the second set of adjacent pixels is included in a pixel amplifier circuit.

B25. The apparatus of any of B1 through B23, wherein the apparatus is operative in accordance with a configuration, wherein exposure of pixels of a plurality of rows of cells of the image sensor array is initiated simultaneously, and wherein there is read out from the image sensor array pixel values correspondingly to bins of pixels having vertically elongated dimensions M×N, N>M.

C1. An imaging apparatus comprising:
an image sensor array;
an imaging lens assembly for focusing an image onto the image sensor array;
wherein the imaging apparatus includes a first configuration in which the imaging apparatus is operative to read out one or more frame of image data from the image sensor array in accordance with a rolling shutter operation in which exposure of pixels of first and second rows of pixels of the image sensor array is initiated sequentially, and wherein pixel values responsive to light incident on pixels of the first and second rows of pixels subject to readout are un-binned pixel values that represent light incident on a spatial area delimited by a single pixel of the image sensor array;
wherein the imaging apparatus includes a second configuration in which of the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values read out using shared global shutter circuitry of the image sensor array that represent light incident on a spatial area delimited by an arrangement of two or more pixels of the image sensor array.

C2. The imaging apparatus of C1, wherein the imaging apparatus includes a hand held housing in which the image sensor array is disposed.

C3. The imaging apparatus of C1, wherein the imaging apparatus is adapted for fixed mounting.

C4. The imaging apparatus of any of C1 through C3, wherein the imaging apparatus is operative so that the first configuration and the second configuration can be activated responsively to an operator input control.

C5. The imaging apparatus of any of C1 through C3, wherein the imaging apparatus is operative to sequentially activate the first configuration and the second configuration on an open loop basis responsively to a trigger signal activation.

C6. The imaging apparatus of C5, wherein the imaging apparatus is operative to sequentially activate the first configuration and the second configuration by activating the second configuration prior to activating the first configuration.

C7. The imaging apparatus of any of C1 through C6, wherein the imaging apparatus is operative to activate one or more of the first configuration and The imaging apparatus of any of claims C1 through C7, wherein the imaging apparatus is operative so that the imaging apparatus can sequentially activate the first configuration and the second configuration during a trigger signal activation period.

C8. The imaging apparatus of C1, wherein the first and second rows of pixels are adjacent rows of pixels.

C9. The imaging apparatus of C1, wherein the first and second rows of pixels are non-adjacent rows of pixels.

C10. The imaging apparatus of any of C1 though C9, wherein the arrangement of two or more pixels is an arrangement of M×N adjacent pixels, M>=2, N>=2.

C11. The imaging apparatus of any of C1 though C9, wherein the arrangement of two or more pixels is an arrangement of 1×N adjacent pixels, N>=2.

C12. The imaging apparatus of C1, wherein the imaging apparatus is operative to attempt to decode a decodable indicia by processing of one or more frame captured with the second configurations active.

C13. The imaging apparatus of any of C1 though C12, wherein the arrangement of two or more pixels in accordance with the second configuration is an arrangement of M×N adjacent pixels, M>=2, N>=2, and wherein the imaging apparatus includes a third configuration in which the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values that are read out using shared global shutter circuitry of the image sensor array and which represent light incident on a spatial area delimited by an arrangement of two or more pixels of the image sensor array, the arrangement of two or more pixels in accordance with the third configuration being an arrangement of 1×N adjacent pixels, N>=2.

D1. A method comprising:
  providing and imaging apparatus having an image sensor array, an imaging lens assembly for focusing an image onto the image sensor array, wherein the imaging apparatus includes a first configuration in which the imaging apparatus is operative to read out one or more frame of image data from the image sensor array in accordance with a rolling shutter operation in which exposure of pixels of first and second rows of pixels of the image sensor array is initiated sequentially, and wherein pixel values responsive to light incident on pixels of the first and second rows of pixels subject to readout are un-binned pixel values that represent light incident on a spatial area delimited by a single pixel of the image sensor array, wherein the imaging apparatus includes a second configuration in which the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values read out using shared global shutter circuitry of the image sensor array that represent light incident on a spatial area delimited by an arrangement of two or more pixels of the image sensor array; and activating one or more of the first configuration and the second configuration.

D2. The method of D1, wherein the activating includes activating one or more of the first configuration and the second configuration responsively to an operator input control.

D3. The method of any of D1 or D2, wherein the activating includes activating one or more of the first configuration and the second configuration responsively to one or more sensed condition.

D4. The method of D3, wherein the one or more sensed condition is an imaging apparatus to target distance.

D5. The method of any of D3 through D4, wherein the sensed condition is sensed by processing of image data captured using the imaging apparatus.

D6. The method of any of D3 through D4, wherein the sensed condition sensed by processing of image data captured using the imaging apparatus, the processing being a processing to recognize a representation of a spatial feature.

D7. The method of any of D3 through D4, wherein the sensed condition sensed by processing of image data captured using the imaging apparatus, the processing being a processing to recognize a representation of a spatial feature, the spatial feature being a decodable indicia.

D8. The method of any of D3 through D7, wherein the activating includes activating one or more of the first configuration and the second configuration responsively to one or more a sensed condition, the sensed condition being sensed during a trigger signal activation period.

D9. The method of any of D1 through D8, wherein the activating includes activating each of the first configuration and the second configuration during a trigger signal activation period.

D10. The method of any of D1 through D2, wherein the activating includes activating each of the first configuration and the second configuration on an open loop basis during a trigger signal activation period.

D11. The method any of D3 through D7, wherein the activating includes activating each of the first configuration and the second configuration responsively to one or more sensed condition during a trigger signal activation period.

D12. The method of any of D1 through D11, wherein the activating includes activating the first configuration for use of the apparatus for document capture, and activating the second configuration for use of the apparatus for reading of decodable indicia.

D13. The method of any of D1 through D12, wherein the arrangement of two or more pixels in accordance with the second configuration is an arrangement of M×N adjacent pixels, M>=2, N>=2, and wherein the providing further includes providing the imaging apparatus to include a third configuration in which the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values read out using shared global shutter circuitry of the image sensor array that represent light incident on a spatial area delimited by an arrangement of two or more pixels of the image sensor array, the arrangement of two or more pixels in accordance with the third configuration being an arrangement of 1×N adjacent pixels, N>=2.

D14. The method of D13, wherein the activating includes activating the first configuration for use of the apparatus for document capture, and activating the second configuration for use of the apparatus for reading of decodable indicia at relatively close range, and wherein the activating includes activating the third configuration for use of imaging apparatus for reading of decodable indicia at relatively long range.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

I claim:

1. An imaging apparatus comprising:
   an image sensor array;
   an imaging lens assembly for focusing an image onto the image sensor array;
   wherein the imaging apparatus includes a first configuration in which the imaging apparatus is operative to read out one or more frame of image data from the image sensor array in accordance with a rolling shutter operation in which exposure of pixels of first and second rows of pixels of the image sensor array is initiated sequentially, and wherein pixel values responsive to light incident on pixels of the first and second rows of pixels subject to readout are un-binned pixel values that represent light incident on a spatial area delimited by a single pixel of the image sensor array;
   wherein the imaging apparatus includes a second configuration in which of the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values read out using shared global shutter circuitry of the image sensor array that represent light incident on a spatial area delimited by an arrangement of two or more pixels of the image sensor array.

2. The imaging apparatus of claim 1, wherein the imaging apparatus includes a hand held housing in which the image sensor array is disposed.

3. The imaging apparatus of claim 1, wherein the imaging apparatus is adapted for fixed mounting.

4. The imaging apparatus of claim 1, wherein the imaging apparatus is operative so that the first configuration and the second configuration can be activated responsively to an operator input control.

5. The imaging apparatus of claim 1, wherein the imaging apparatus is operative to sequentially activate the first configuration and the second configuration on an open loop basis responsively to a trigger signal activation.

6. The imaging apparatus of claim 5, wherein the imaging apparatus is operative to sequentially activate the first configuration and the second configuration by activating the second configuration prior to activating the first configuration.

7. The imaging apparatus of claim 1, wherein the imaging apparatus is operative so that the imaging apparatus can sequentially activate the first configuration and the second configuration during a trigger signal activation period.

8. The imaging apparatus of claim 1, wherein the first and second rows of pixels are adjacent rows of pixels.

9. The imaging apparatus of claim 1, wherein the first and second rows of pixels are non-adjacent rows of pixels.

10. The imaging apparatus of claim 1, wherein the arrangement of two or more pixels is an arrangement of M×N adjacent pixels, M>=2, N>=2.

11. The imaging apparatus of claim 1, wherein the arrangement of two or more pixels is an arrangement of 1×N adjacent pixels, N>=2.

12. The imaging apparatus of claim 1, wherein the imaging apparatus is operative to attempt to decode a decodable indicia by processing of one or more frame captured with the second configurations active.

13. The imaging apparatus of claim 1, wherein the arrangement of two or more pixels in accordance with the second configuration is an arrangement of M×N adjacent pixels, M>=2, N>=2, and wherein the imaging apparatus includes a third configuration in which the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values that are read out using shared global shutter circuitry of the image sensor array and which represent light incident on a spatial area delimited by an arrangement of two or more pixels of the image sensor array, the arrangement of two or more pixels in accordance with the third configuration being an arrangement of 1×N adjacent pixels, N>=2.

14. A method comprising:
    providing and imaging apparatus having an image sensor array, an imaging lens assembly for focusing an image onto the image sensor array, wherein the imaging apparatus includes a first configuration in which the imaging apparatus is operative to read out one or more frame of image data from the image sensor array in accordance with a rolling shutter operation in which exposure of pixels of first and second rows of pixels of the image sensor array is initiated sequentially, and wherein pixel values responsive to light incident on pixels of the first and second rows of pixels subject to readout are un-binned pixel values that represent light incident on a spatial area delimited by a single pixel of the image sensor array, wherein the imaging apparatus includes a second configuration in which the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values read out using shared global shutter circuitry of the image sensor array that represent light incident on a spatial area delimited by an arrangement of two or more pixels of the image sensor array; and
    activating one or more of the first configuration and the second configuration.

15. The method of claim 14, wherein the activating includes activating one or more of the first configuration and the second configuration responsively to an operator input control.

16. The method of claim 14, wherein the activating includes activating one or more of the first configuration and the second configuration responsively to one or more sensed condition.

17. The method of claim 16, wherein the one or more sensed condition is an imaging apparatus to target distance.

18. The method of claim 16, wherein the sensed condition is sensed by processing of image data captured using the imaging apparatus.

19. The method of claim 16, wherein the sensed condition sensed by processing of image data captured using the imaging apparatus, the processing being a processing to recognize a representation of a spatial feature.

20. The method of claim 16, wherein the sensed condition sensed by processing of image data captured using the imaging apparatus, the processing being a processing to recognize a representation of a spatial feature, the spatial feature being a decodable indicia.

21. The method of claim 16, wherein the activating includes activating one or more of the first configuration and the second configuration responsively to one or more a sensed condition, the sensed condition being sensed during a trigger signal activation period.

22. The method of claim 14, wherein the activating includes activating each of the first configuration and the second configuration during a trigger signal activation period.

23. The method of claim 14, wherein the activating includes activating each of the first configuration and the second configuration on an open loop basis during a trigger signal activation period.

24. The method of claim 1, wherein the activating includes activating each of the first configuration and the second configuration responsively to one or more sensed condition during a trigger signal activation period.

25. The method of claim 14, wherein the activating includes activating the first configuration for use of the apparatus for document capture, and activating the second configuration for use of the apparatus for reading of decodable indicia.

26. The method of claim 14, wherein the arrangement of two or more pixels in accordance with the second configuration is an arrangement of M×N adjacent pixels, M>=2, N>=2, and wherein the providing further includes providing the imaging apparatus to include a third configuration in which the imaging apparatus is operative to read out one or more frame of image data from the image sensor array in accordance with a global shutter operation in which exposure of pixels of the first and second rows of pixels of the image sensor array is initiated and terminated simultaneously, and wherein pixel values responsive to light incident on pixels of the first and second rows of pixels subject to readout are binned pixel values read out using shared global shutter circuitry of the image sensor array that represent light incident on a spatial area delimited by an arrangement of two or more pixels of the image sensor array, the arrangement of two or more pixels in accordance with the third configuration being an arrangement of 1×N adjacent pixels, N>=2.

27. The method of claim 26, wherein the activating includes activating the first configuration for use of the apparatus for document capture, and activating the second configuration for use of the apparatus for reading of decodable indicia at relatively close range, and wherein the activating includes activating the third configuration for use of imaging apparatus for reading of decodable indicia at relatively long range.

* * * * *